(12) United States Patent
Tsai et al.

(10) Patent No.: US 11,514,326 B2
(45) Date of Patent: Nov. 29, 2022

(54) DRIFT REGULARIZATION TO COUNTERACT VARIATION IN DRIFT COEFFICIENTS FOR ANALOG ACCELERATORS

(71) Applicant: INTERNATIONAL BUSINESS MACHINES CORPORATION, Armonk, NY (US)

(72) Inventors: Hsinyu Tsai, San Jose, CA (US); Sanjay Kariyappa, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 358 days.

(21) Appl. No.: 16/905,241

(22) Filed: Jun. 18, 2020

(65) Prior Publication Data

US 2021/0397967 A1     Dec. 23, 2021

(51) Int. Cl.
*G06N 3/08*     (2006.01)
*G06N 3/063*    (2006.01)
*G06V 10/75*    (2022.01)

(52) U.S. Cl.
CPC .......... *G06N 3/084* (2013.01); *G06N 3/0635* (2013.01); *G06V 10/751* (2022.01)

(58) Field of Classification Search
CPC ........ G06N 3/049; G06N 3/088; G06N 3/084; G06N 3/0454; G06N 3/08; G06N 3/0635; G06V 10/751; G06V 10/82
See application file for complete search history.

(56) References Cited

U.S. PATENT DOCUMENTS 9,798,751 B2 * 10/2017 Birdwell ................ G06N 3/086
10,372,968 B2    8/2019 Aghamohammadi et al.
(Continued)

FOREIGN PATENT DOCUMENTS

EP    3591584 A1 *  1/2020
EP    4002219 A1 * 11/2020
(Continued)

OTHER PUBLICATIONS

Mixed-precision architecture based on computational memory for training deep neural networks—2018 (Year: 2018).*
(Continued)

*Primary Examiner* — Nizar N Sivji
(74) *Attorney, Agent, or Firm* — Erik A. Huestis; Stephen J. Kenny; Foley Hoag, LLP

(57) ABSTRACT

Drift regularization is provided to counteract variation in drift coefficients in analog neural networks. In various embodiments, a method of training an artificial neural network is illustrated. A plurality of weights is randomly initialized. Each of the plurality of weights corresponds to a synapse of an artificial neural network. At least one array of inputs is inputted to the artificial neural network. At least one array of outputs is determined by the artificial neural network based on the at least one array of inputs and the plurality of weights. The at least one array of outputs is compared to ground truth data to determine a first loss. A second loss is determined by adding a drift regularization to the first loss. The drift regularization is positively correlated
(Continued)

to variance of the at least one array of outputs. The plurality of weights is updated based on the second loss by backpropagation.

18 Claims, 28 Drawing Sheets

(56) References Cited

U.S. PATENT DOCUMENTS

| | | | |
|---|---|---|---|
| 10,387,771 B2 | 8/2019 | Judd et al. | |
| 2016/0358075 A1* | 12/2016 | Zhang | G06N 3/063 |
| 2017/0286830 A1* | 10/2017 | El-Yaniv | G06N 3/0454 |
| 2019/0042199 A1* | 2/2019 | Sumbul | G11C 11/404 |
| 2019/0065956 A1* | 2/2019 | Qian | G06N 3/0454 |
| 2019/0108436 A1* | 4/2019 | David | G06N 3/0454 |
| 2019/0130275 A1* | 5/2019 | Chen | G06N 3/0454 |
| 2019/0354865 A1* | 11/2019 | Reisser | G06N 3/0481 |
| 2020/0327406 A1* | 10/2020 | Piveteau | G11C 13/0069 |
| 2021/0406661 A1* | 12/2021 | Timofejevs | G06N 3/0454 |

FOREIGN PATENT DOCUMENTS

| | | | |
|---|---|---|---|
| JP | 2019509871 A | * 11/2019 | |
| WO | WO-2021137900 A1 | * 7/2021 | G06F 1/03 |

OTHER PUBLICATIONS

Accurate deep neural network inference using computational phase-change memory—2020 (Year: 2020).*
Mixed-precision training of deep neural networks using computational memory—2017 (Year: 2017).*
Anonymous, "Fast Simulation with Multiple Multi-Layer Neural Networks," IP.com No. IPCOM000247603D (2016).
Anonymous, "System and Method for Computing Complexity of Neural Network Models," IP.com No. IPCOM000258772D (2019).
Ben-Nun et al., "Demystifying Parallel and Distributed Deep Learning: An In-Depth Concurrency Analysis," 1:1-46 (2018).
Boybat et al., "Improved Deep Neural Network hardware-accelerators based on Non-Volatile Memory: the Local Gains technique," IEEE (2018).
Huang, "Hybrid Analog-Digital Co-Processing for Scientific Computation," Columbia University Doctoral Thesis (2018).
Wozniak, "Unsupervised Learning of Phase-Change-Based Neuromorphic Systems," Lausanne, EPFL (2017).

* cited by examiner

DRIFT REGULARIZATION TO COUNTERACT VARIATION IN DRIFT COEFFICIENTS FOR ANALOG ACCELERATORS

BACKGROUND

Embodiments of the present disclosure relate to analog artificial neural networks, and more specifically, to drift regularization to counteract variation in drift coefficients.

BRIEF SUMMARY

According to embodiments of the present disclosure, methods of and computer program products for training artificial neural networks are provided. In various embodiments, a method of training an artificial neural network is illustrated. A plurality of weights is randomly initialized. Each of the plurality of weights corresponds to a synapse of an artificial neural network. At least one array of inputs is inputted to the artificial neural network. At least one array of outputs is determined by the artificial neural network based on the at least one array of inputs and the plurality of weights. The at least one array of outputs is compared to ground truth data to determine a first loss. A second loss is determined by adding a drift regularization to the first loss. The drift regularization is positively correlated to variance of the at least one array of outputs. The plurality of weights is updated based on the second loss by backpropagation.

DETAILED DESCRIPTION

Figure 1:
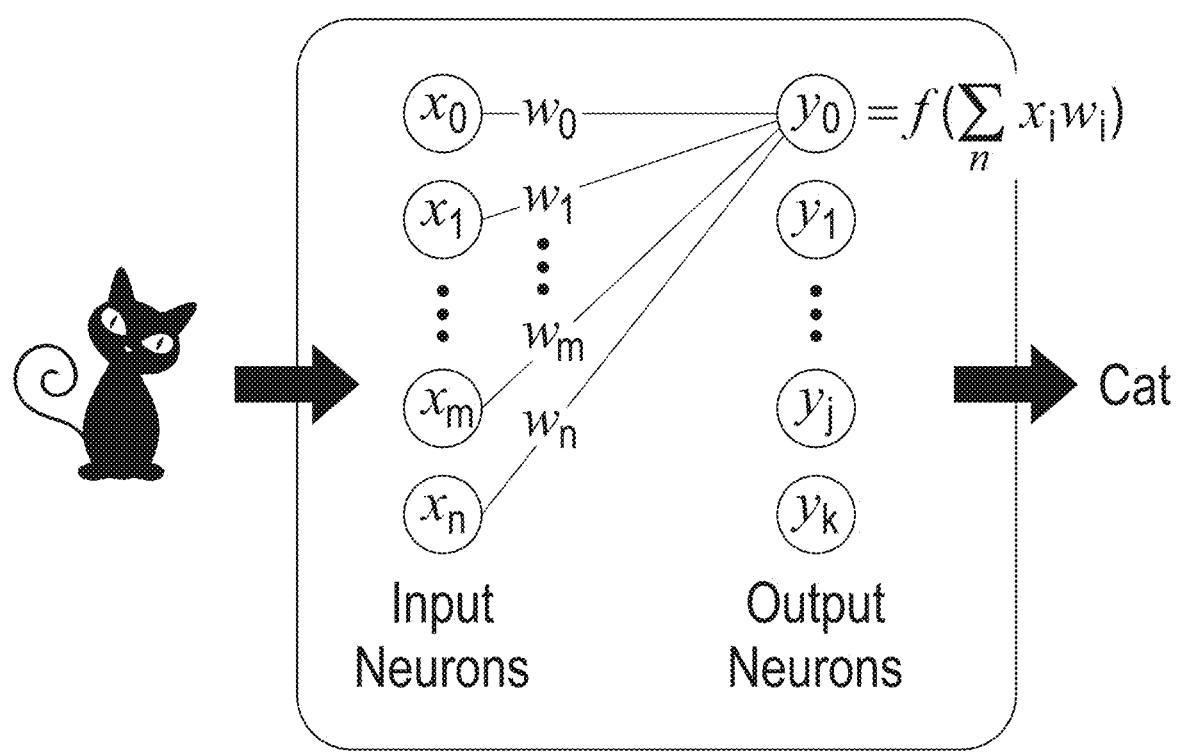
FIG. 1 illustrates an exemplary computational graph for a DNN according to embodiments of the present disclosure.

Several applications of Deep Neural Networks (DNNs) demand that these models run on resource-constrained platforms such as mobile phones and edge devices with a low energy budget. This can be challenging, as DNN models with state-of-the-art classification accuracies have high compute and memory requirements, with each inference pass typically requiring on the order of millions of multiply-accumulate operations. To address this problem, digital accelerators may be used, which offer significant improvements in speed and energy efficiency over CPUs and GPUs. Digital accelerators may be based on von Neumann architectures, in which data are stored in a separate off-chip memory (usually DRAM) and transferred on-chip in order to perform computations. A drawback of such designs is that the energy associated with data movement often ends up being a dominant factor, limiting the energy efficiency that can be achieved.

Analog computation with in-memory computation offers an alternative for hardware acceleration of DNNs. Analog accelerators leverage crossbar array structures to store data and perform computation in the analog domain using resistive memory devices. Accelerators may be based on Phase Change Memory (PCM), Memristors, or Resistance RAM (RRAM). The ability to perform computation in-memory significantly reduces data movement and allows analog accelerators to achieve an order of magnitude better energy efficiency compared to digital designs.

PCM devices offer several advantages, such as a mature process technology, high endurance, and large resistance contrast that leads to a larger number of intermediate conductance states. When encoding DNN weights as conductance values, one or more pairs of PCM devices can be used to represent each weight. This provides coverage for both positive and negative weights, improves conductance dynamic range, and reduces the effect of device noise. Intermediate conductance states in PCM devices are achieved by modulating the volume ratio between the amorphous and crystalline phases of a chalcogenite material. DNN inference may be performed with weights computed from analog conductance values that are programmed and measured from arrays of PCM devices. In some implementations, all computations in DNN inference are performed within or at the edge of the crossbar array in the analog domain, without the need to move weights to a separate compute unit or to convert activations to digital bit representation.

As outlined above, Phase Change Memory (PCM) based analog AI accelerators are useful for inference in edge applications due to the energy efficiency offered by in-memory computation. Unfortunately, noise sources inherent to PCM devices can cause inaccuracies in the Deep Neural Network (DNN) weight values, which leads to a degradation in the classification accuracy of the model. In particular, PCM devices exhibit a phenomenon called conductance drift, whereby the conductances of PCM devices gradually decay over a period of time, following a power law. This phenomenon is associated with continued relaxation of the amorphous phase of the PCM material. The present disclosure provides methods for making the training algorithm noise-aware, thus enabling networks to be trained that can retain high classification accuracy despite the corruption of weight values due to conductance drift.

Referring now to FIG. 1, an exemplary computational graph is provided for a deep artificial neural network (DNN).

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various algorithms may be used for this learning process. Certain algorithms may be suitable for specific tasks such as image recognition, speech recognition, or language processing. Training algorithms lead to a pattern of synaptic weights that, during the learning process, converges toward an optimal solution of the given problem. Backpropagation is one suitable algorithm for supervised learning, in which a known correct output is available during the learning process. The goal of such learning is to obtain a system that generalizes to data that were not available during training.

In general, during backpropagation, the output of the network is compared to the known correct output. An error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

It will be appreciated that a variety of error metrics are known in the art, for example, cross-entropy loss or square of the Euclidean distance. It will likewise be appreciated that a variety of regularization methods are known in the art, including L1 (Lasso regression) or L2 (ridge regression).

When applying backpropagation, an ANN rapidly attains a high accuracy on most of the examples in a training set. The vast majority of training time is spent trying to further increase this test accuracy. During this time, a large number of the training data examples lead to little correction, since the system has already learned to recognize those examples. While, in general, ANN performance tends to improve with the size of the data set, this can be explained by the fact that larger data-sets contain more borderline examples between the different classes on which the ANN is being trained.

Figure 2:
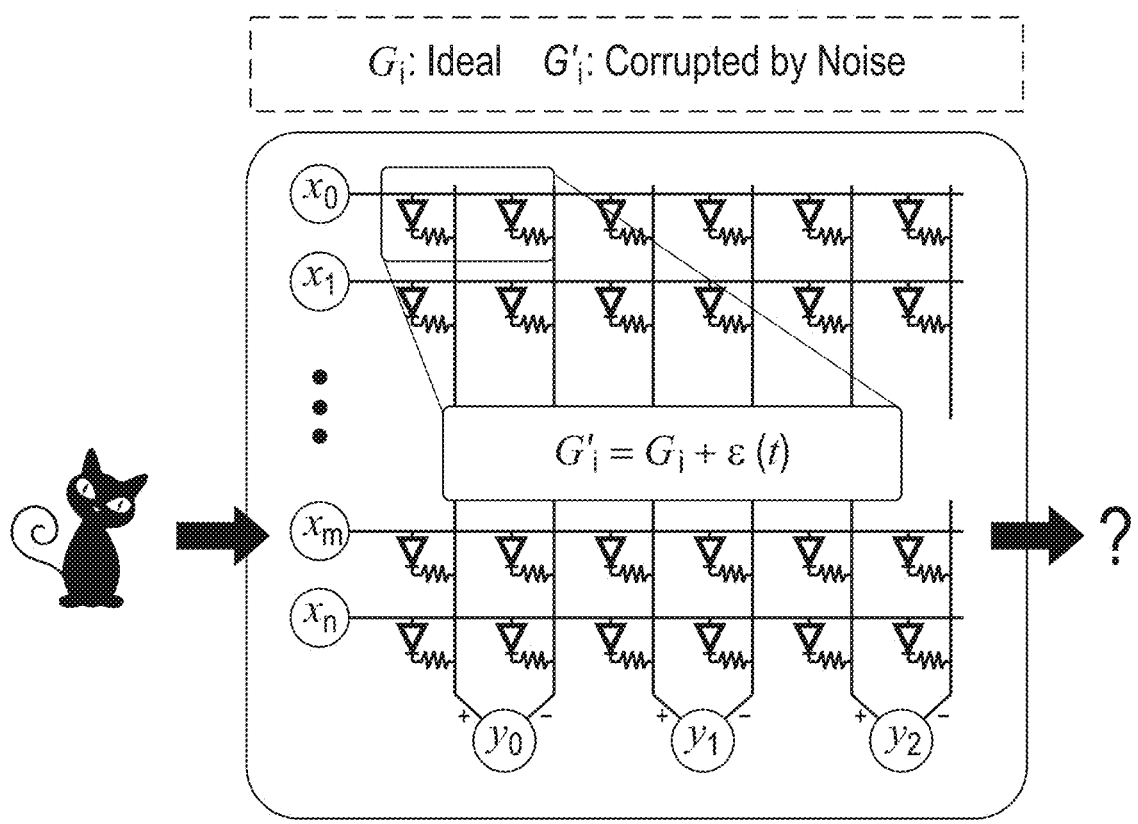
FIG. 2 illustrates an exemplary hardware implementation of a DNN according to embodiments of the present disclosure.

Referring to FIG. 2, an exemplary hardware implementation of a DNN is provided. In this example, conductance noise causes errors in the weight values when encoded as conductances (G) on PCM-based analog accelerators.

Modifications of weight values due to conductance noise can cause a severe degradation in classification accuracy of the model. For instance, in the presence of conductance noise, the accuracy of a 3-layer convolutional neural network trained on the CIFAR-10 dataset drops by 15.6% in a month. The degradation in accuracy continues to increase due to the impact of drift noise, which causes the error in weight values to increase with time. This degradation of classification accuracy poses a major barrier for the adoption of PCM-based analog accelerators as a replacement to digital accelerators if not addressed.

The reason for this degradation in accuracy can be attributed to the assumptions made during the training of the DNN. Conventional DNN training assumes that the DNN weights used during inference are deterministic and identical copies of the weights in the original trained model. Barring quantization noise, this assumption is generally valid for inference using digital hardware. In contrast, when the trained model is deployed on analog inference hardware, weights behave as random variables due to conductance noise. Since the weights are no longer true copies of the original weights, we cannot be certain that the modified network will retain the high classification accuracy of the original model obtained from the training algorithm.

Loss of accuracy due to noise can be attributed to the change in the relative strengths of the output neurons in the presence of noise. The present disclosure shows that by reducing the variance of these neuron values during training, the relative strength of neurons can be preserved, thereby reducing degradation in classification accuracy. To this end, a drift regularization function is provided to reduce the variance of neuron values and improve the noise-robustness of the DNN.

Figure 3A:
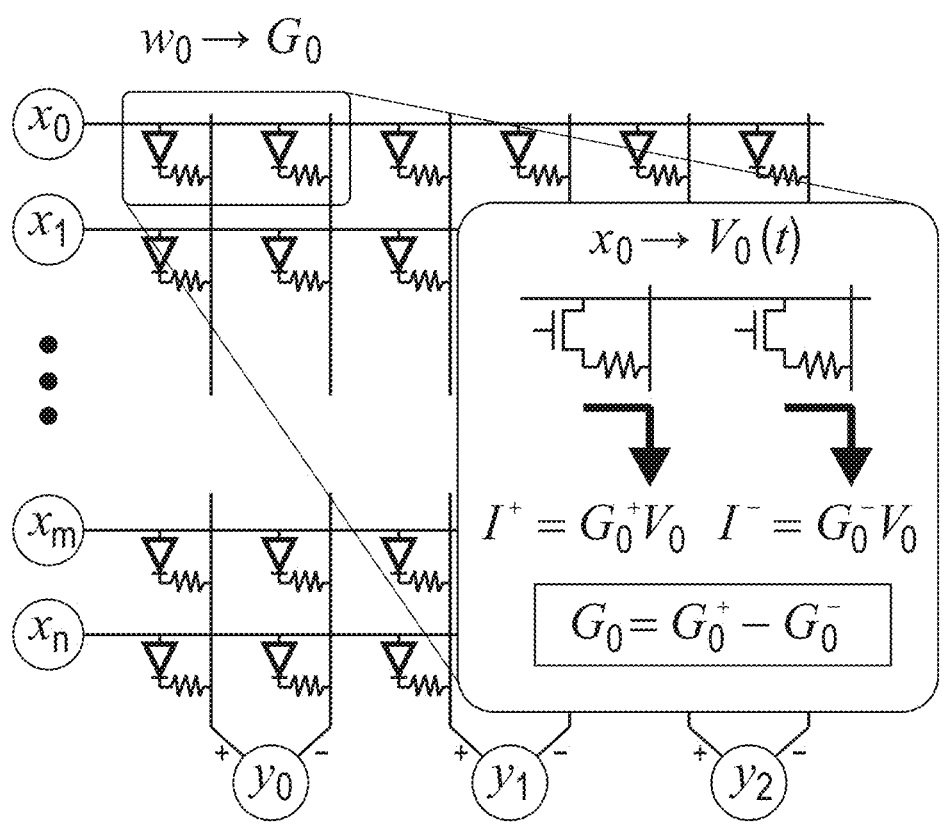
FIGS. 3A-B illustrate an exemplary crossbar array according to embodiments of the present disclosure.
Figure 3B:
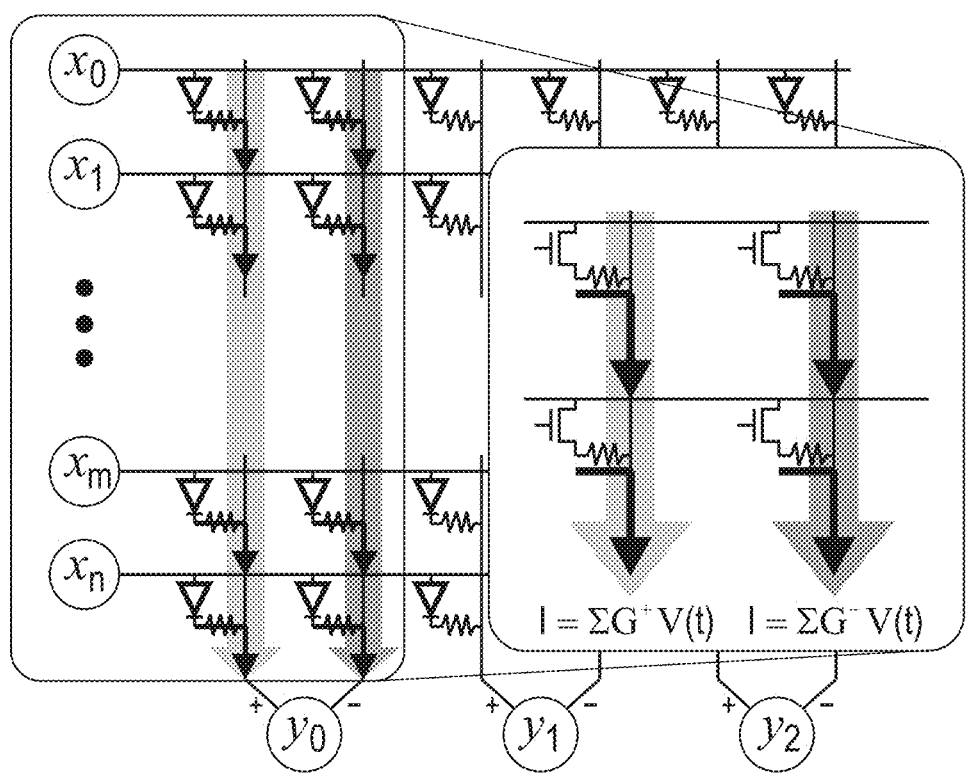

Referring to FIG. 3, an exemplary crossbar array is illustrated according to embodiments of the present disclosure. Weights $w_{ij}$ of the DNN are encoded as conductances $G^+$-$G^-$, and inputs x are encoded as voltages or voltage pulses. In FIG. 3A, multiplication $x_i w_{ij}$ is performed by using Ohm's law I=GV, producing a current 1 that represents the product. In FIG. 3B, accumulation of the product terms, $\Sigma_n x_i w_{ij}$, is done by adding the currents along a column using Kirchhoff's current law.

DNNs consist of a sequence of layers, each containing a set of neurons. Evaluating the value of each neuron in a layer involves taking the inner product between a set of input neurons $\{x_i\}$ and the weights $\{w_{ij}\}$ associated with the layer and applying a non-linear function $f$ to compute the output neurons $\{y_j\}$ as shown below. It will be appreciated that a variety of functions $f$ are employed in various network configurations, including a ReLU.

$$y_j = f\left(\sum_n x_i w_{ij}\right) \quad \text{Equation 1}$$

Analog accelerators for DNN inference are built using a crossbar structure of resistive elements as shown in FIG. 3A. The weight values (w) obtained from the trained DNN model can be encoded as conductance values (G) of analog non-volatile memory devices, also known as memristive devices. To convert weight values to conductances, a conversion factor is defined by taking the ratio of the magnitude of the largest weight in a layer ($w_{max}$) and the largest conductance value $G_{max}$, and then use this to convert weight values to conductances, as shown below.

$$G_i = \frac{G_{max}}{w_{max}} \cdot w_i \quad \text{Equation 2}$$

Since weights can take both positive and negative values, weights are encoded as the difference between the conductance values of a pair of devices ($G^+$ and $G^-$). The input neurons $x_i$ are encoded as voltages and are applied along the rows of the crossbar. By the principle of Ohm's law, the devices in the $i^{th}$ row produce currents proportional to the product of the $x_i$ and $w_{ij}$ terms as shown in FIG. 3A. Accumulation of the product terms is performed by using Kirchhoff's current law to add the currents along the column. The results are stored at the bottom of the array and can be sent for downstream processing of the next layer in the DNN.

In contrast to CMOS-based digital accelerators which have separate units for computation and memory, analog accelerators reduce the amount of data movement by performing computations in memory. This leads to a significantly higher energy efficiency (G-Ops/Watt) as compared to digital accelerators. Additionally, multiple crossbar structures can be interconnected to process all the layers of the DNN in a pipelined fashion, providing an advantage in speed and throughput. Several memristive devices like ReRAM, MRAM and Flash may be used to construct the crossbar structure.

A Phase Change Memory (PCM) device primarily consists of a chalcogenide glass material with a heating element. By the application of heat produced through electrical pulses, the phase of the material can be changed between crystalline and amorphous states. Depending on the phase of the material, the conductance of the material changes significantly, and this can be used to encode the weight values of the DNN.

As noted above, PCM devices suffer from the phenomenon of conductance drift, whereby the conductance values of the devices decay with time following a power law. The decay in conductance is characterized below.

$$G'(t) = G_0 \cdot \left(\frac{t}{t_0}\right)^{-\nu} \quad \text{Equation 3}$$

where $\nu \sim \mathcal{N}(\mu, \sigma^2)$

Here, $G_0$ represents the initial measure of the conductance value taken at time $t_0$, and $G_t(t)$ represents the value of conductance at time t. Time is measured from the instant the programming of the device is complete. $\nu$ is a device-specific parameter called the drift coefficient, which describes the exponential rate at which the conductance value decays with time.

Figure 4:
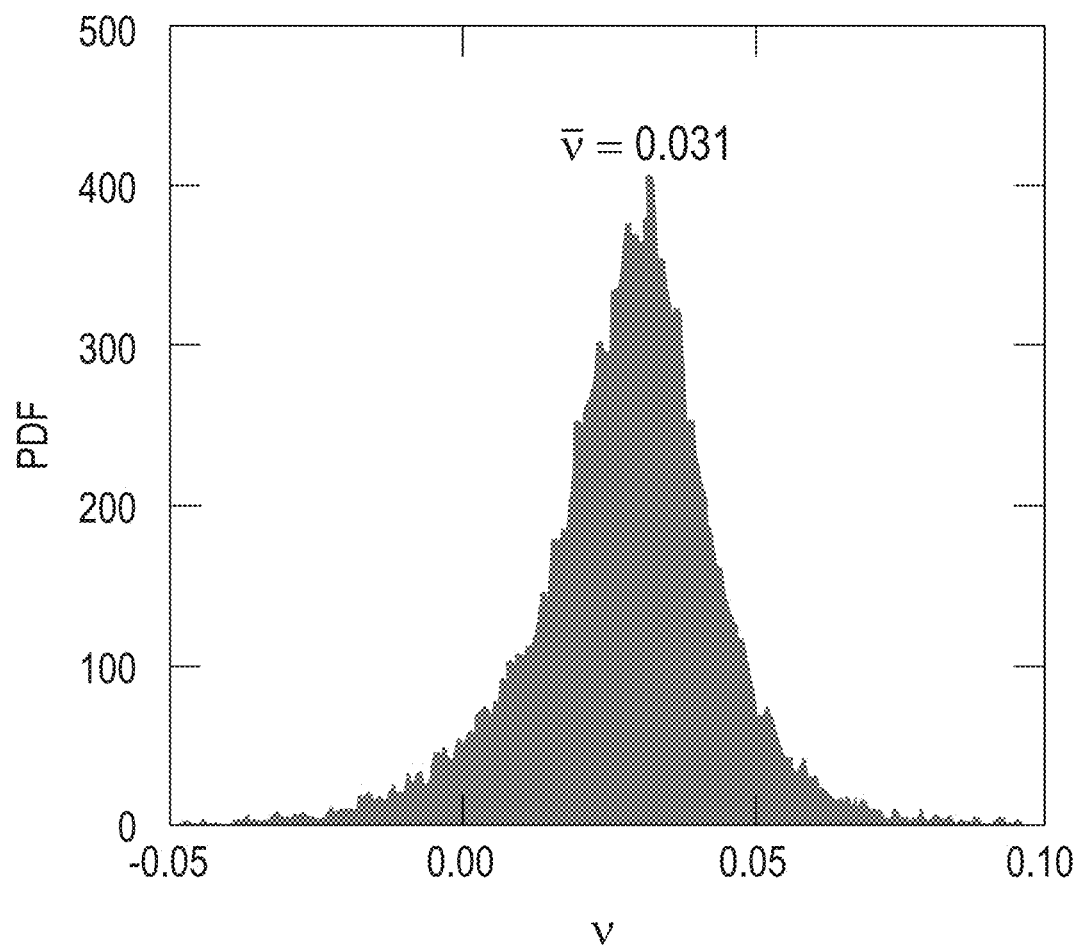
FIG. 4 is an exemplary histogram of drift coefficient according to embodiments of the present disclosure.

Referring to FIG. 4, an exemplary histogram of drift coefficient $\nu$ is provided. The distribution of drift coefficient $\nu$ is determined by measuring the rate of decay of the device conductance over time after applying multiple programming pulses to a set of 20,000 PCM devices. The experimentally measured distributions are averaged over multiple trials, multiple devices, and various programmed conductance values. For simplicity of explanation, it is assumed that the same normal distribution with a mean value of 0.031 and a standard deviation of 0.007 applies to PCM devices at all conductance states. Since $\nu$ is normally distributed and appears in the exponent as shown above, $G_t(t)$ follows a log-normal distribution. It will be appreciated that the mean and standard deviation above are exemplary, and not limiting of the techniques described herein.

Figure 5A:
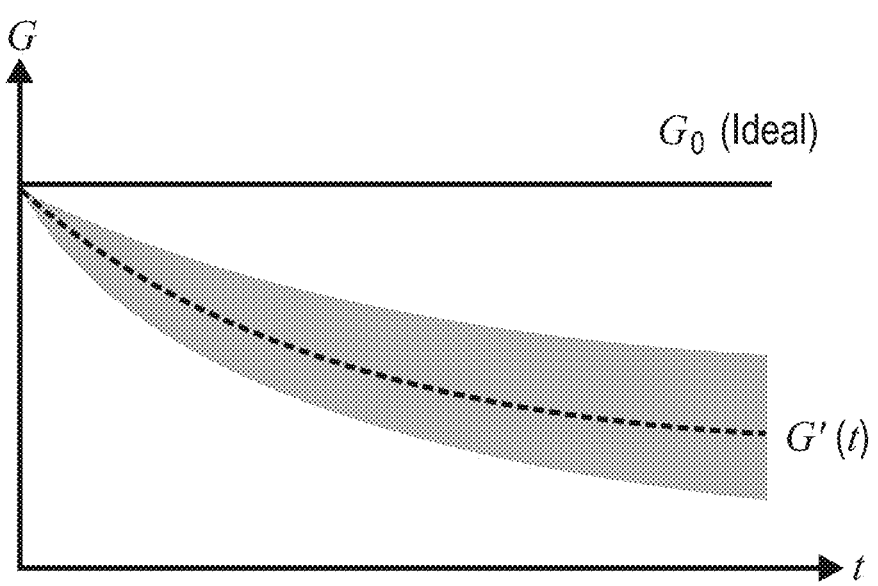
FIGS. 5A-B illustrate distribution of the decaying conductance value as a function of time according to embodiments of the present disclosure.
Figure 5B:
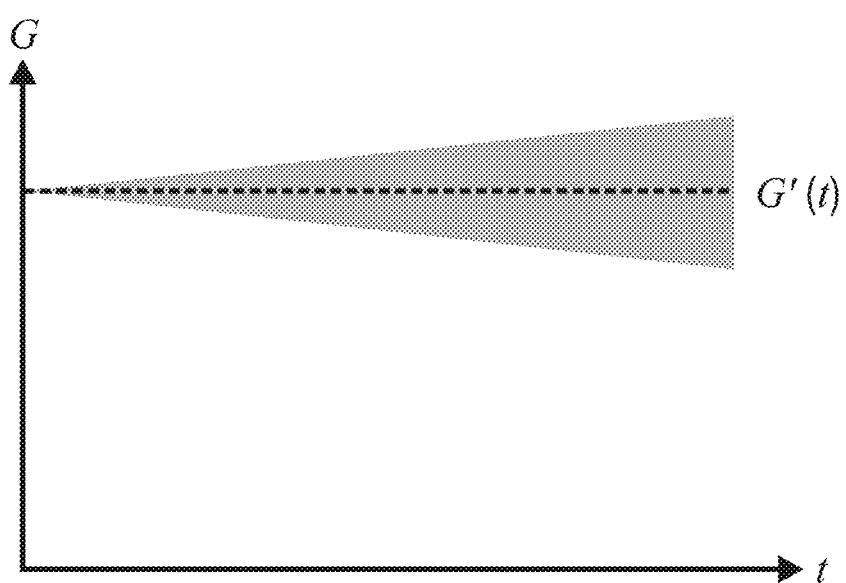

Referring to FIG. 5A, a graph is provided of the distribution of the decaying conductance value as a function of time. The dotted line represents the mean value of Gt(t). Conductance (G) decays with time (t) due to drift and follows a log-normal distribution described above. FIG. 5B shows the mean value of the distribution corrected by multiplying with a suitable scaling factor.

The mean value of this distribution can be corrected and centered on the original conductance $G_0$ by amplifying the product terms associated with the weight using an appropriate scaling factor. While this scaling factor changes in time along with the mean drift, for any inference operation at a given point in time, it is a scalar constant. This changes the log-normal distribution of $G_t(t)$ to have a mean of $G_0$, as shown in FIG. 5B. However, as there is still a distribution associated with the conductance (weight) values, a degradation in accuracy due to the deviation of the conductance from the original value $G_0$ can be expected.

By reducing the variance of the neuron values, the relative strengths of the neurons are preserved. To this end, a drift regularization term is included in the loss function to reduce the variance of the neuron values, and in this way improve noise-robustness of the DNN.

As shown above, drift causes the weight/conductance values to decay with time. While the mean value of this decay can be corrected by multiplication with the appropriate correction factor, the increasing variance of the weight values with time causes the accuracy to degrade. The degradation in the classification accuracy of the DNN due to drift noise can be attributed to the change in the relative strengths of the output neurons resulting in an incorrect prediction. For instance, consider a DNN that is trained for a binary classification task. Let x be an input that gets correctly classified as class-A in the absence of noise. This means that the output neuron associated with Class-A ($y_A$) has a higher value than the output neuron associated with Class-B ($y_B$), that is $y_A > y_B$. With conductance noise however, the output can change to class-B if the evaluation of the input with noisy weight values results in $y_A < y_B$, causing the DNN to misclassify the input as class-B. In this way, noise in the values of weights can change the relative strengths of the output neurons leading to a degradation in the classification accuracy of the DNN. The likelihood of such reordering can be reduced by reducing the variance in the values of neurons in the presence of conductance noise. In various embodiments, this is accomplished by modifying the loss function used during the training of the DNNs by adding a novel regularization term.

Figure 6:
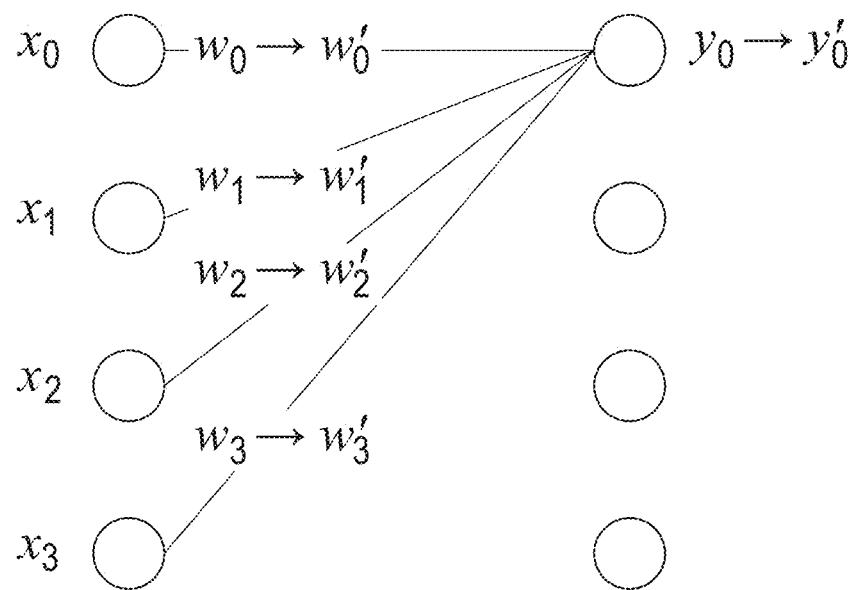
FIG. 6 illustrates an exemplary two-layer artificial neural network according to embodiments of the present disclosure.
Figure 7A:
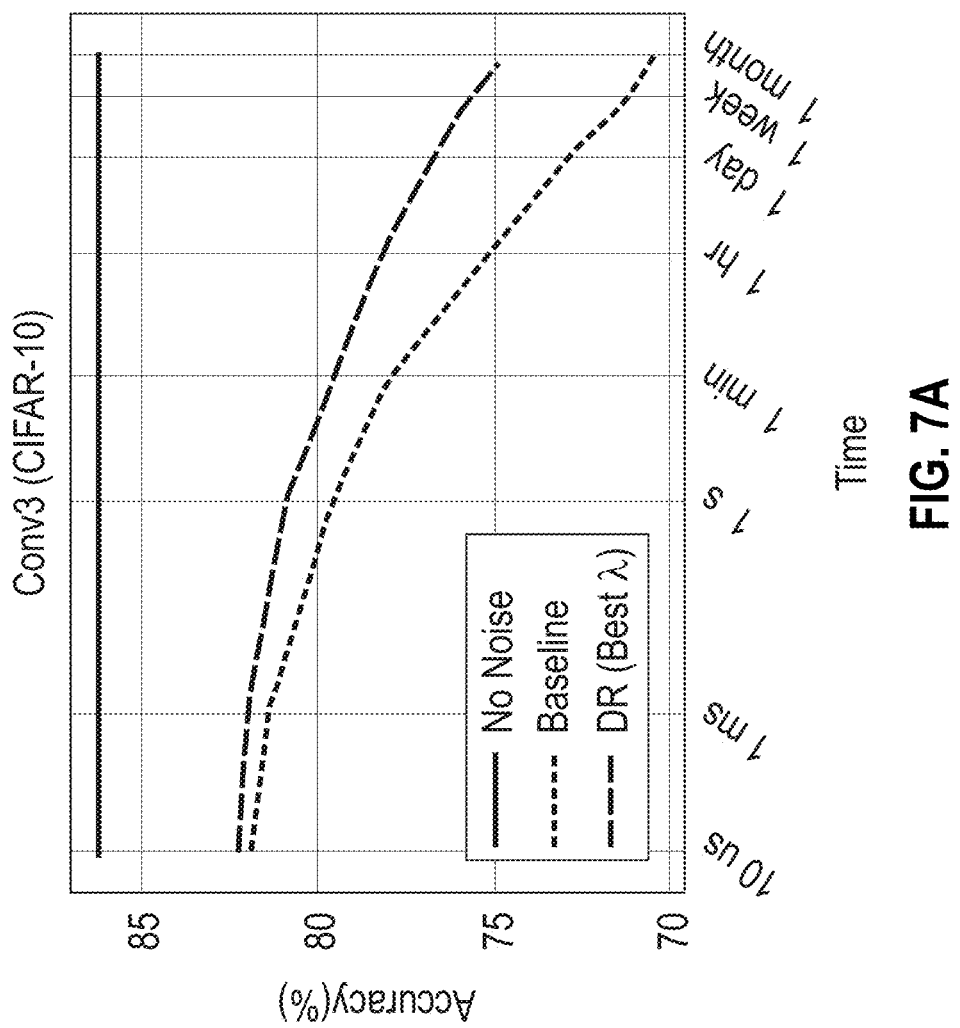
FIGS. 7A-D illustrate accuracy over time of exemplary networks according to embodiments of the present disclosure.
Figure 7B:
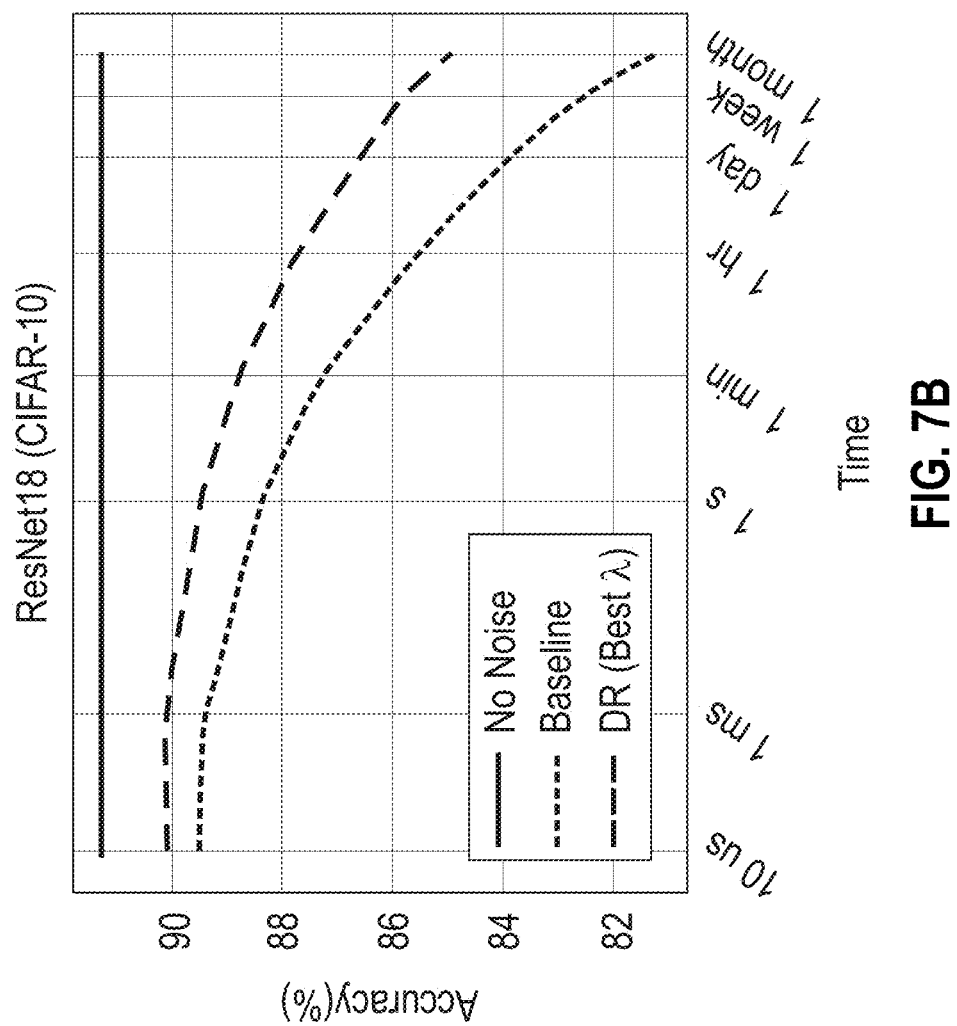
Figure 7C:
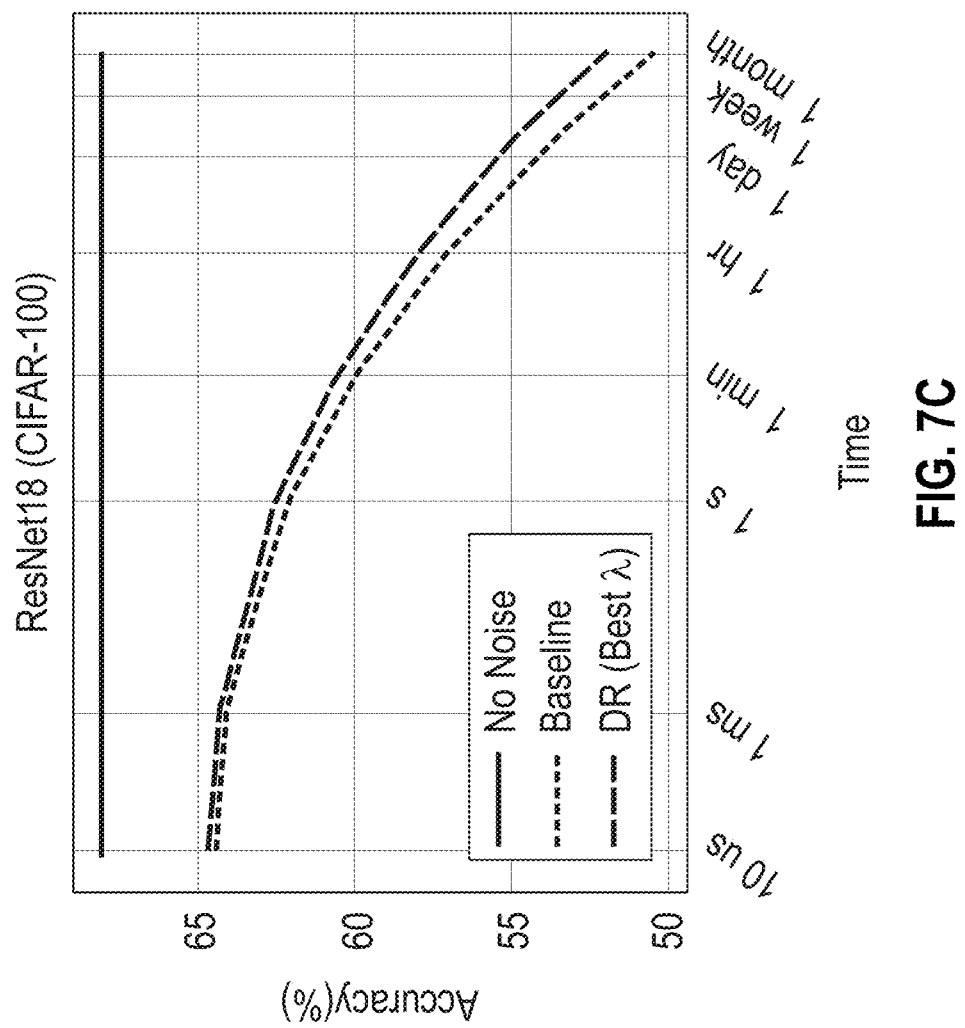
Figure 7D:
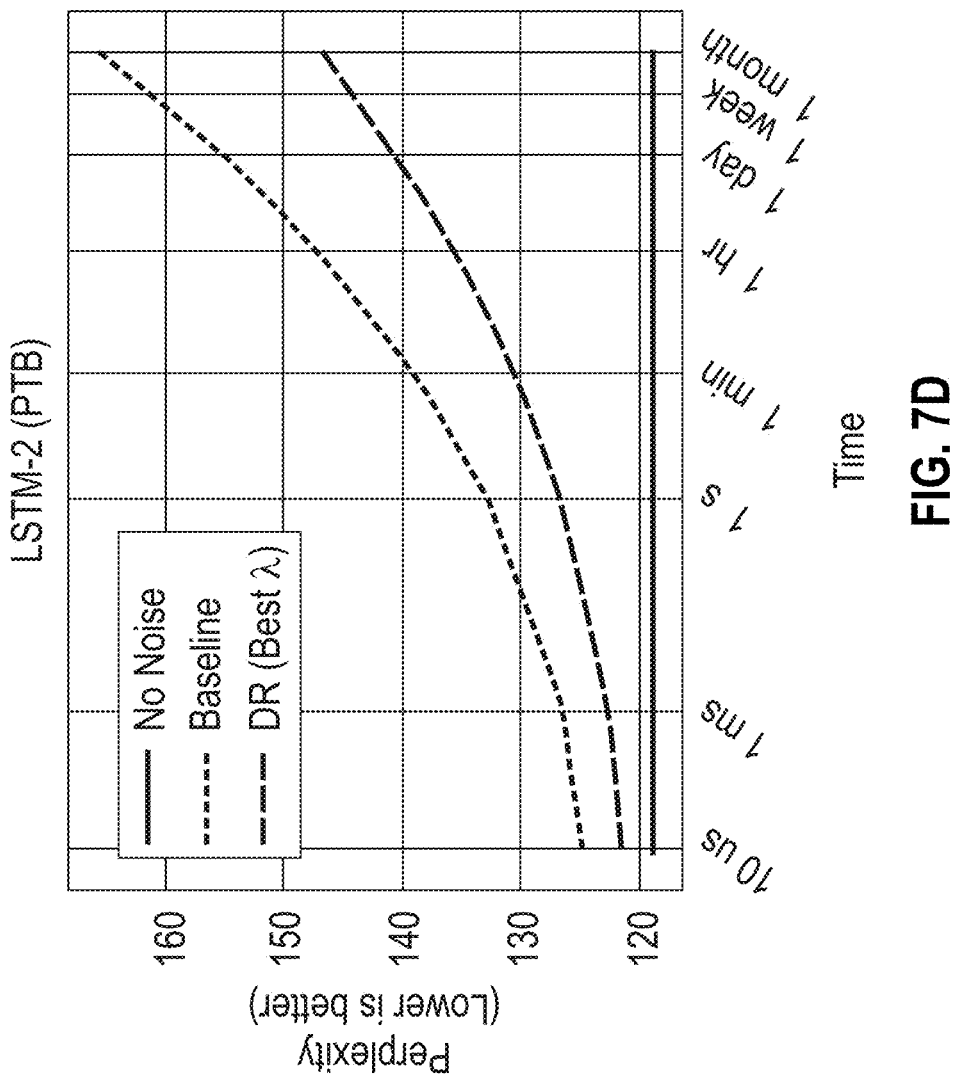
Figure 8A:
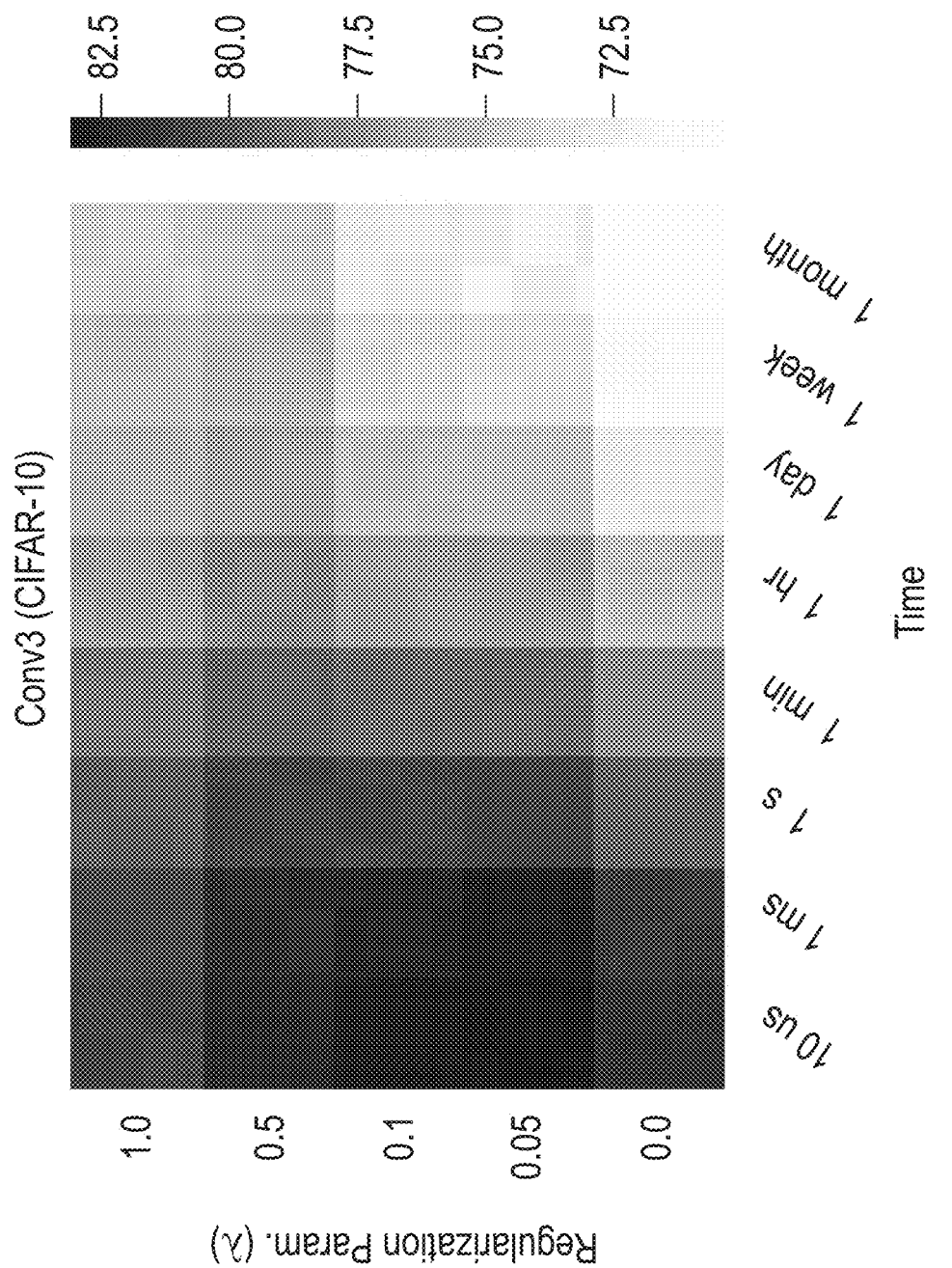
FIGS. 8A-D provide heatmaps showing classification-accuracy/perplexity with various drift regularization parameters according to embodiments of the present disclosure.
Figure 8B:
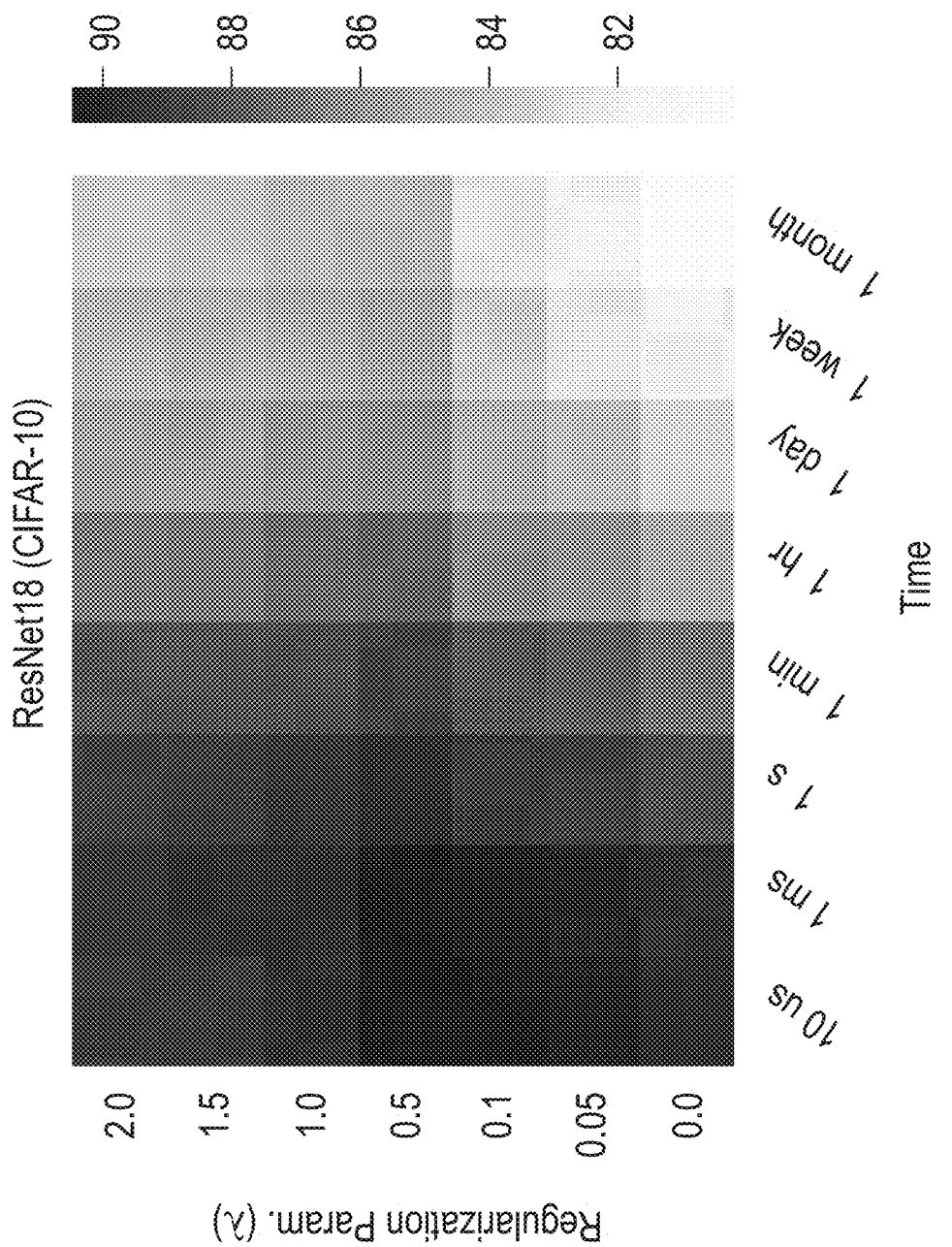
Figure 8C:
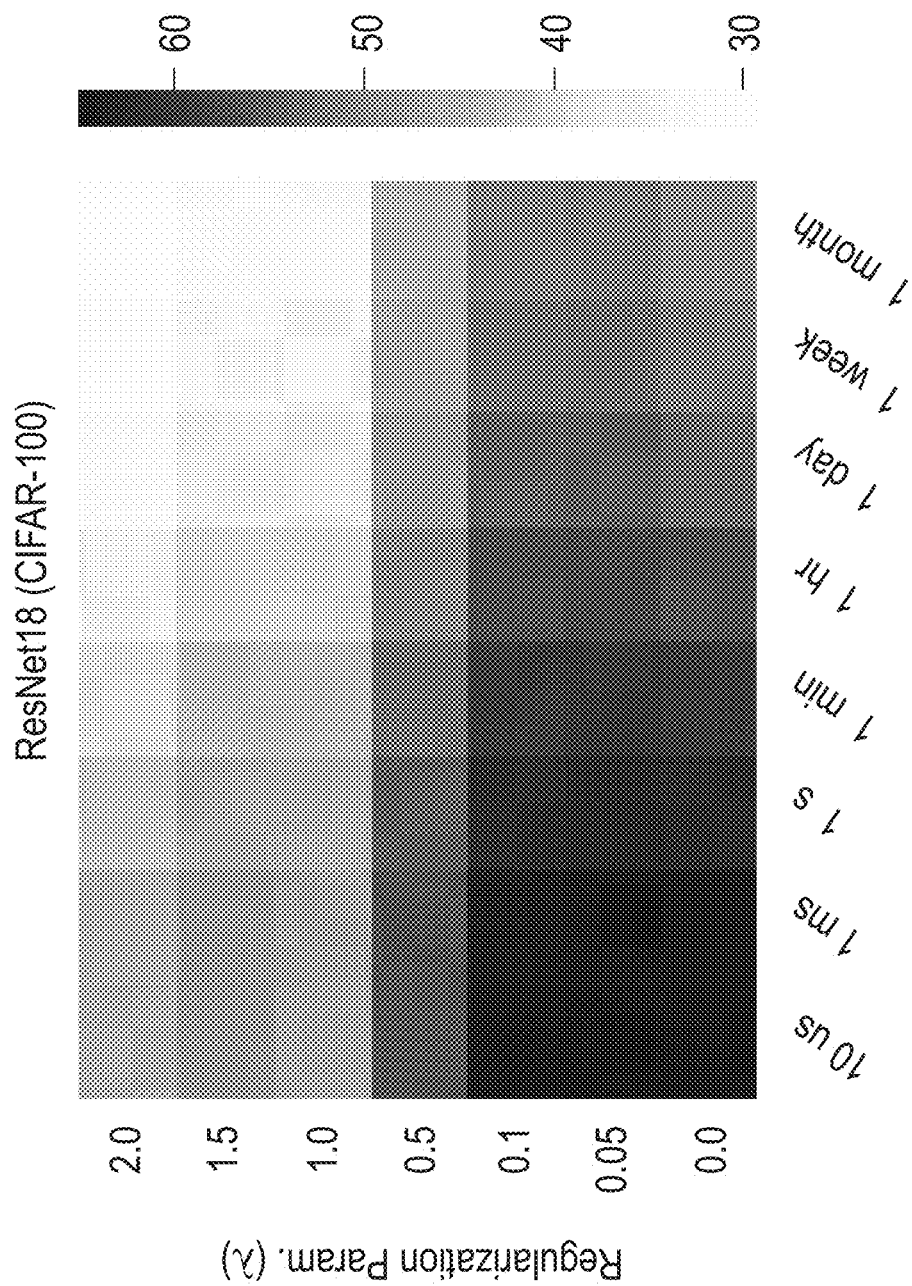
Figure 8D:
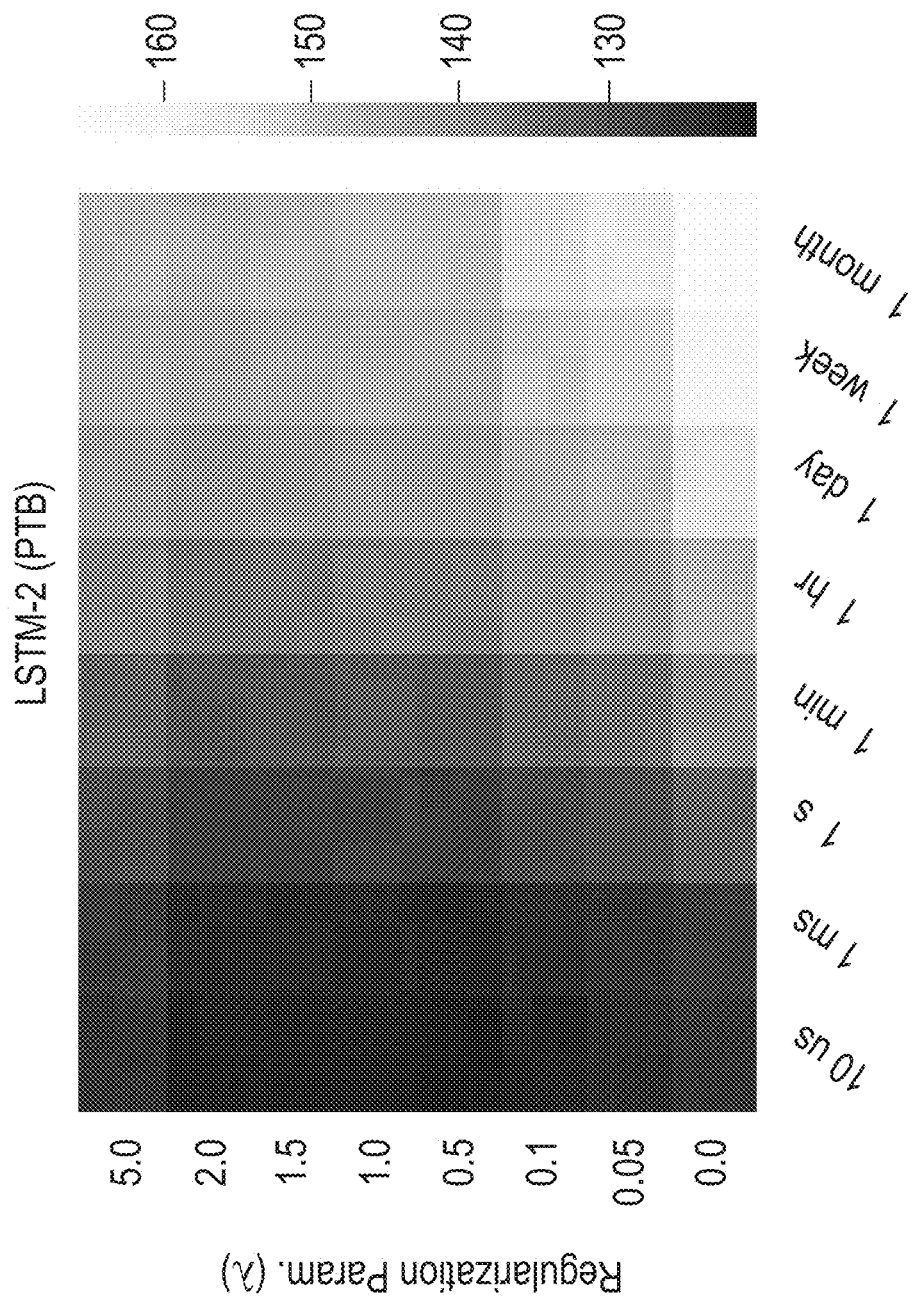
Figure 9A:
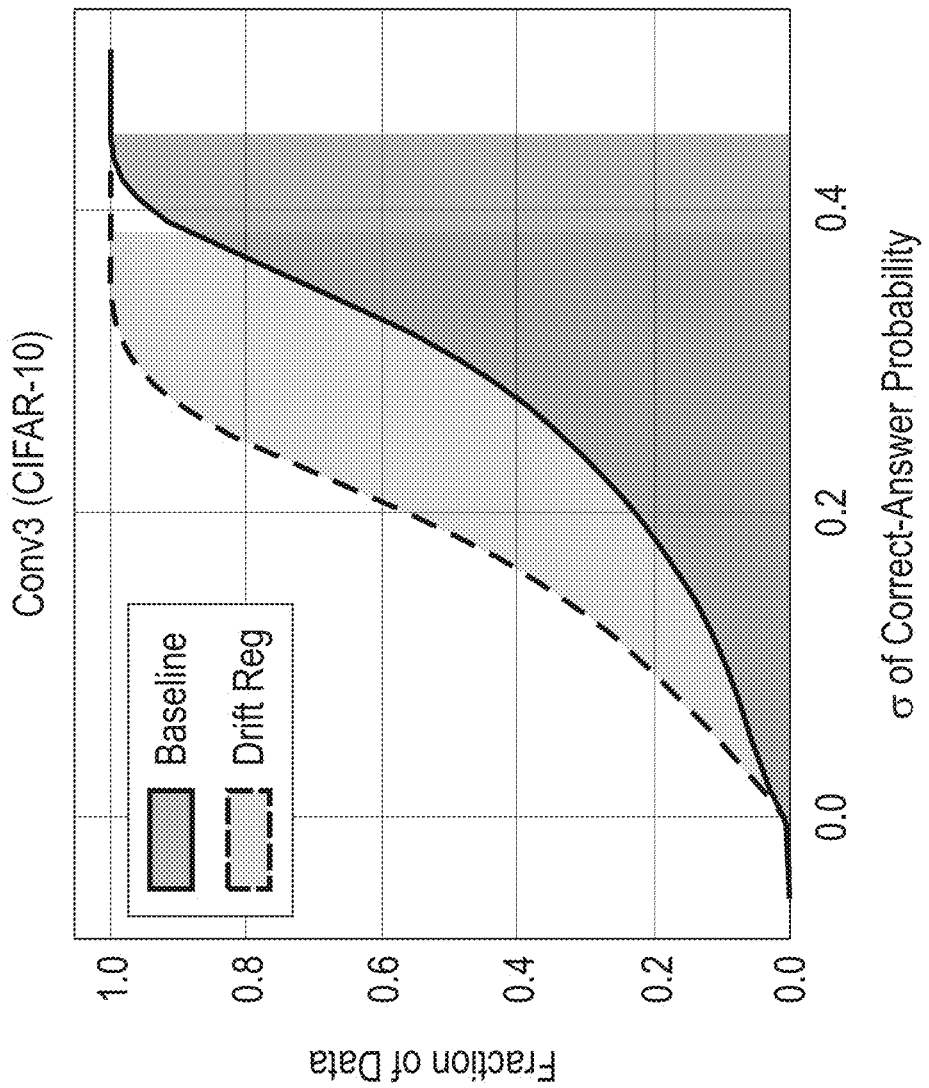
FIGS. 9A-D provide graphs of cumulative distribution of the standard deviation of the correct-answer probability according to embodiments of the present disclosure.
Figure 9B:
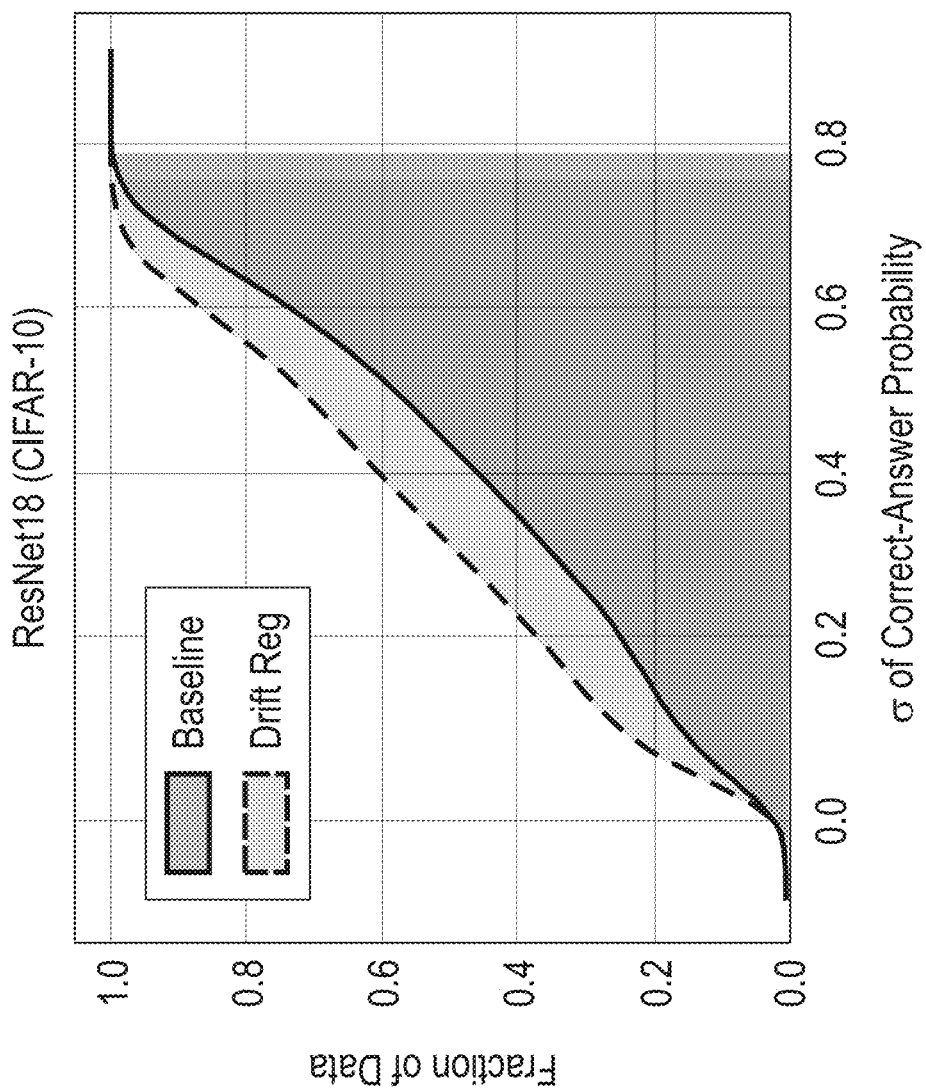
Figure 9C:
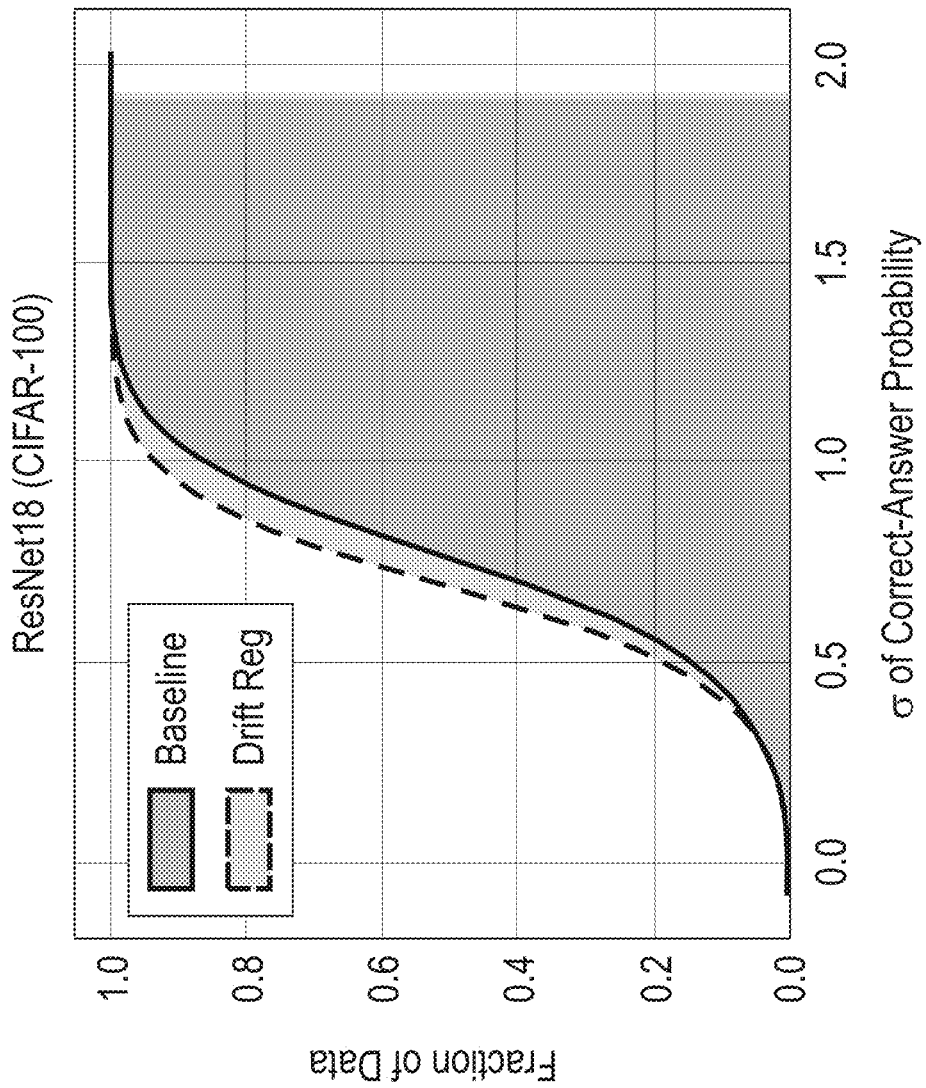
Figure 9D:
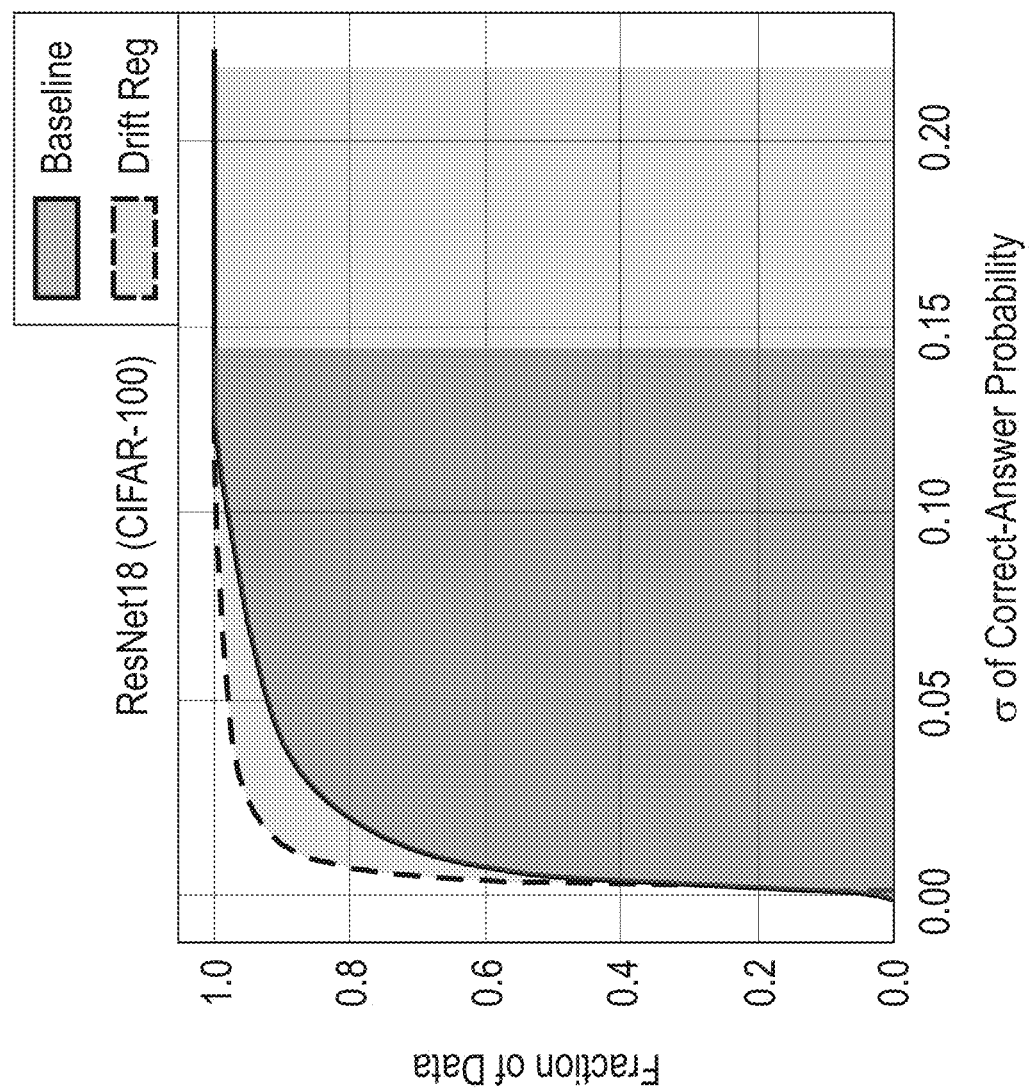

Referring to FIG. 6, an exemplary two-layer neural network is illustrated with both original and drift-modified values of neurons and weights. The value of the output neurons with no noise is given below.

$$y_j = f\left(\sum_n x_i w_i\right) \quad \text{Equation 4}$$

Under the influence of drift noise, the original weights of the network $w_i$ get modified to $w_t$ as shown below.

$$w'_i = w_i \cdot d_i \quad \text{Equation 5}$$

where $d_i = \left(\frac{t}{t_0}\right)^{-\nu}, \nu \sim \mathcal{N}(1, \sigma_d^2)$ The expression for the value of the neurons in the presence of drift noise is given below.

$$y'_j = f\left(\sum_n x_i w'_i\right) \quad \text{Equation 6}$$

$$\Rightarrow y'_j = f\left(\sum_n x_i w_i d_i\right)$$

$$\Rightarrow y'_j = f\left(\sum_n p_i d_i\right)$$

where $p_i = x_i w_i$

The above is a simplified expression for the drift-modified values of the neurons in terms of the original product terms $p_i$. An expression can be derived for the standard deviation of the drift-modified neuron values as follows.

$$StdDev(y'_j) = StdDev\left(f\left(\sum_n p_i d_i\right)\right) \quad \text{Equation 7}$$

$$\sigma_{y'} \propto StdDev\left(\sum_n p_i d_i\right)$$

The expression for $\sigma_{y'}$ may be simplified by eliminating the non-linearity $f$ using a first order approximation as shown above. Note that this simplification consists of a weighted combination of $d_i$ terms. Since all the $d_i$ terms are identically distributed random variables, this expression may be simplified as follows.

$$\sigma_{y'} \propto StdDev(p_1 d_1 + p_2 d_2 + \ldots + p_n d_n) \quad \text{Equation 8}$$

$$\Rightarrow \sigma_{y'} \propto \sqrt{p_1^2 \sigma_d^2 + p_2^2 \sigma_d^2 + \ldots + p_n^2 \sigma_d^2}$$

$$\Rightarrow \sigma_{y'} \propto \sqrt{\sum_n p_i^2 \sigma_d^2}$$

$$\Rightarrow \sigma_{y'} \propto \sigma_d \cdot \sqrt{\sum_n p_i^2}$$

$$\Rightarrow \sigma_{y'} \propto \sigma_d \cdot \|p_i\|_2$$

where $\sigma_d = StdDev$ of drift noise $d_i$

The expression for the StdDev of y' has two terms: $\sigma_d$ and $\|p_i\|_2$ as described above. Thus, the StdDev of y' may be reduced by reducing either or both terms. Note that the first term $\sigma_d$ is determined by the characteristics of the PCM devices, and improving this would involve modifying the PCM devices. In contrast, the second term $\|p_i\|_2$ is a function of the network parameters and is completely independent of the device characteristics. Thus, by manipulating the network parameters, $\|p_i\|_2$ can be reduced, correspondingly reducing the value of the StdDev of neurons $\sigma_{y'}$. To this end, a regularization function is provided. For each neuron $y_j$ in the DNN, the regularization term $R_j$ is defined as follows.

$$R_j = \|p_i\|_2 \quad \text{Equation 9}$$

Thus, to encourage the neurons in the DNNs to have a smaller variance under conductance noise, the loss function can be modified using an additional drift-regularization term as shown below. Minimizing this regularization term translates to an improvement in the noise robustness by preserving the relative strengths of neurons in the presence of conductance noise.

$$Loss = CE - Loss + \lambda \sum_j R_j^2 \quad \text{Equation 10}$$

$\lambda$ controls the amount of importance given to the regularization function above. $\lambda$ is treated as a hyperparameter, and a sweep is performed to determine the value that provides the smallest degradation of accuracy with conductance noise. The detailed results from this hyperparameter sweep are presented below.

It will be appreciated that while various examples herein are discussed with regard to a two-layer network, the present disclosure is applicable to multilayer networks of any size. In some embodiments with a multi-layer network, the output values (y) of the output layer are considered in accordance with the above discussion. In other embodiments, the output at each layer is treated as y, in which case $R^2$ terms from all layers are added before multiplying by the hyperparameter $\lambda$.

Referring to FIGS. 7A-E, graphs are provided for accuracy over time in various exemplary embodiments. In these graphs, the solid line denotes no noise—a hypothetical network with no conductance noise. The dashed line denotes a baseline network subject to conductance drift. The dotted line denotes a network trained with drift regularization (with the best value of $\lambda$). Drift regularization results in a smaller degradation in classification accuracy/perplexity compared to the baseline network.

As shown, the classification accuracy of the Conv3 network trained on CIFAR-10 degrades by 11.3% in 1 month when trained with drift regularization, as compared to a degradation of 15.6% for the baseline case. These results illustrate that reducing variance of neurons through drift regularization can help reduce the degradation of classification accuracy of DNNs caused due to conductance noise.

Referring to FIGS. 8A-E, heatmaps are provided showing classification-accuracy/perplexity vs. time, for networks trained with different values of drift regularization parameter $\lambda$. Increasing the value of $\lambda$ improves performance at time t=1 month. However, making $\lambda$ too large hurts performance.

Drift Regularization improves noise robustness by reducing the variance of the neuron values under conductance drift by the use of a regularization term. $\lambda$ is a hyperparameter that controls the relative importance of the regularization term during training. In this example, models are trained with different values of drift regularization parameter $\lambda$. The heat maps in FIG. 8 show the accuracy/perplexity of the network under conductance noise as a function of time on the x-axis. The bottom row represents a baseline case with $\lambda=0$. The plot shows the accuracy of networks trained with increasing values of 2 on the y-axis. Networks trained with higher values of $\lambda$ show better accuracy/perplexity at time t=1 month compared to the baseline case, showing that drift regularization improves the robustness of the network to conductance noise. If the value of $\lambda$ is too high, then the performance of the DNN degrades, as can be observed by the topmost row in the heatmaps.

FIGS. 9A-D show graphs of cumulative distribution of the standard deviation of the correct-answer probability. Drift regularization reduces the standard deviation ($\sigma$) of the neurons, improving the noise robustness of the DNN.

Drift regularization reduces the standard deviation of the neuron values under conductance noise. To evaluate the impact of drift regularization on the standard deviation of neurons, two versions of the DNN are considered, one trained with drift regularization and the other trained without. The standard deviation of the output probability of the correct class is compared between the two networks, measured using multiple noise samples for each test input. For instance, consider a test input x that is labeled as Class-A. A distribution of output probability of Class-A with input x is generated across multiple versions of the network obtained by sampling noise. The standard deviation of the output probability can be evaluated using this distribution.

The standard deviation of the output probability can be computed for all the test inputs in the dataset to generate a cumulative distribution of standard deviations for the two networks considered. The results comparing the CDFs of the correct output probability for the networks with and without drift regularization are shown in FIGS. 9A-D. As shown, the drift regularized networks tend to have a lower standard deviation of output probabilities compared to the baseline network across the 3 networks considered. Accordingly, drift regularization lowers the standard deviation of the neurons, and in this way achieves better noise resilience.

Figure 10A:
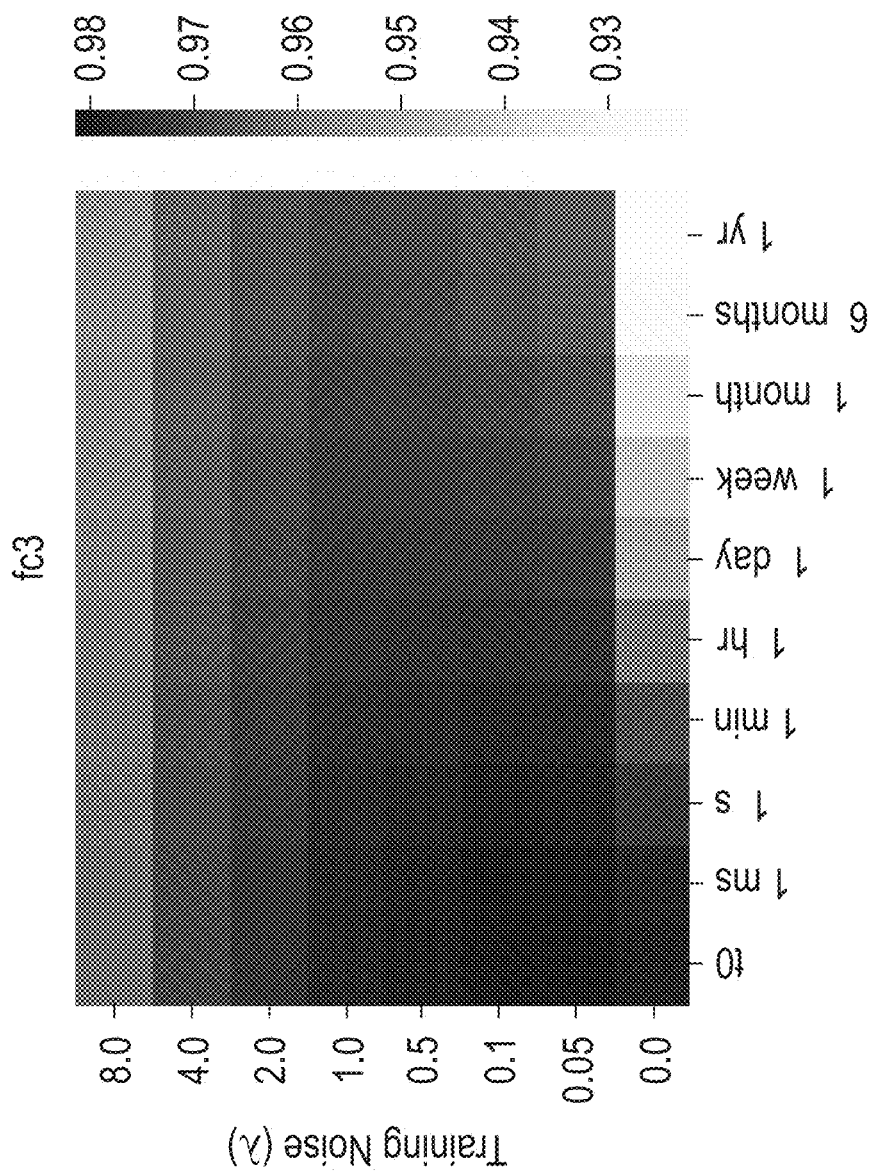
FIGS. 10A-C provide additional heatmaps are provided showing classification-accuracy/perplexity with various drift regularization parameters according to embodiments of the present disclosure.
Figure 10B:
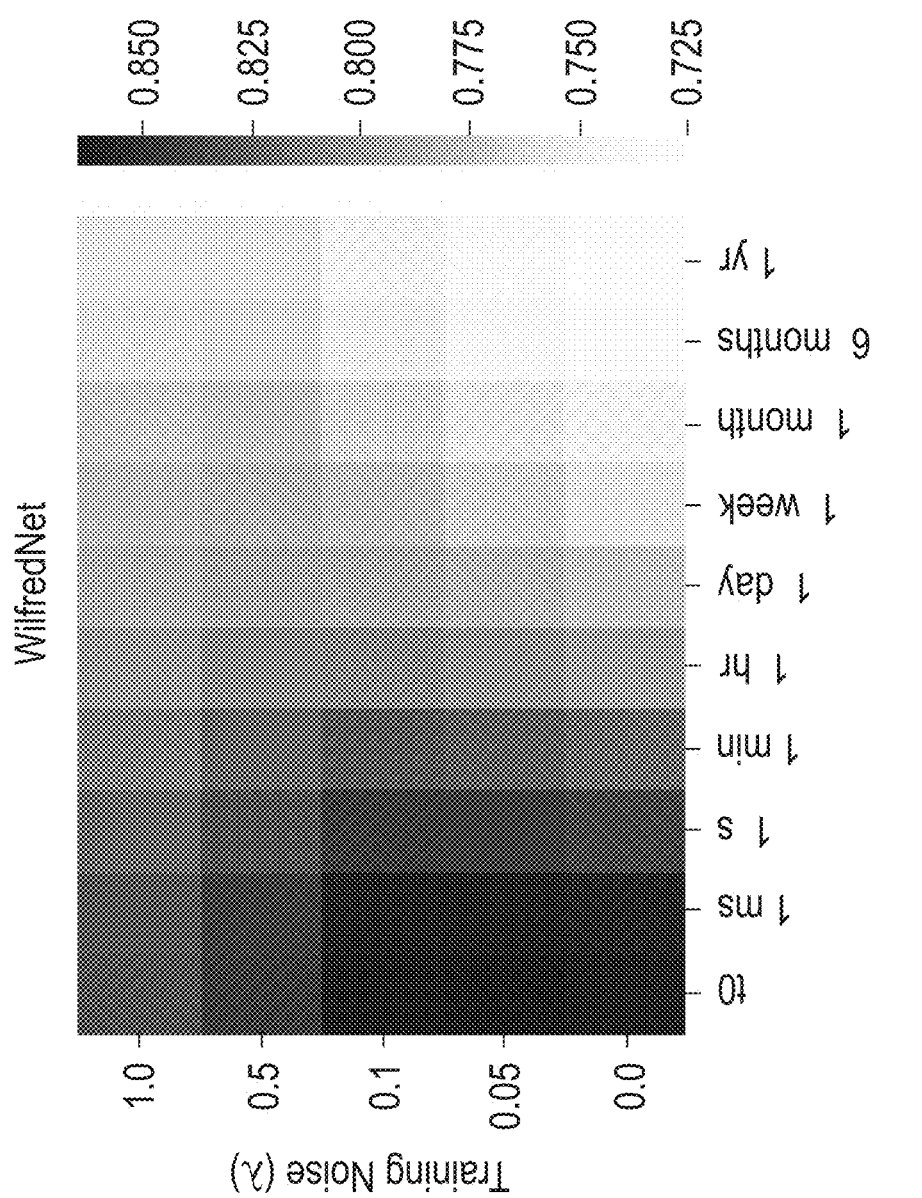
Figure 10C:
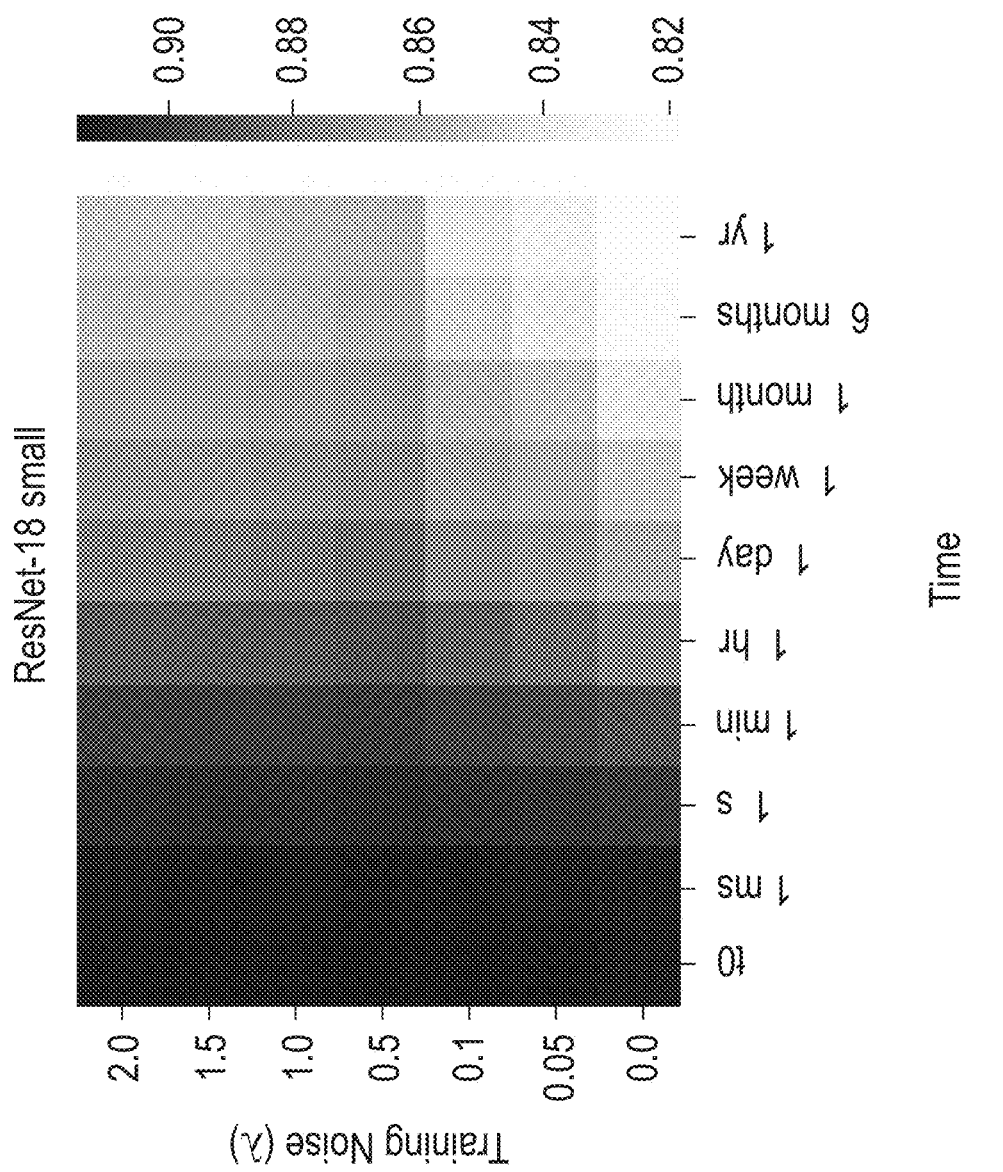
Figure 11A:
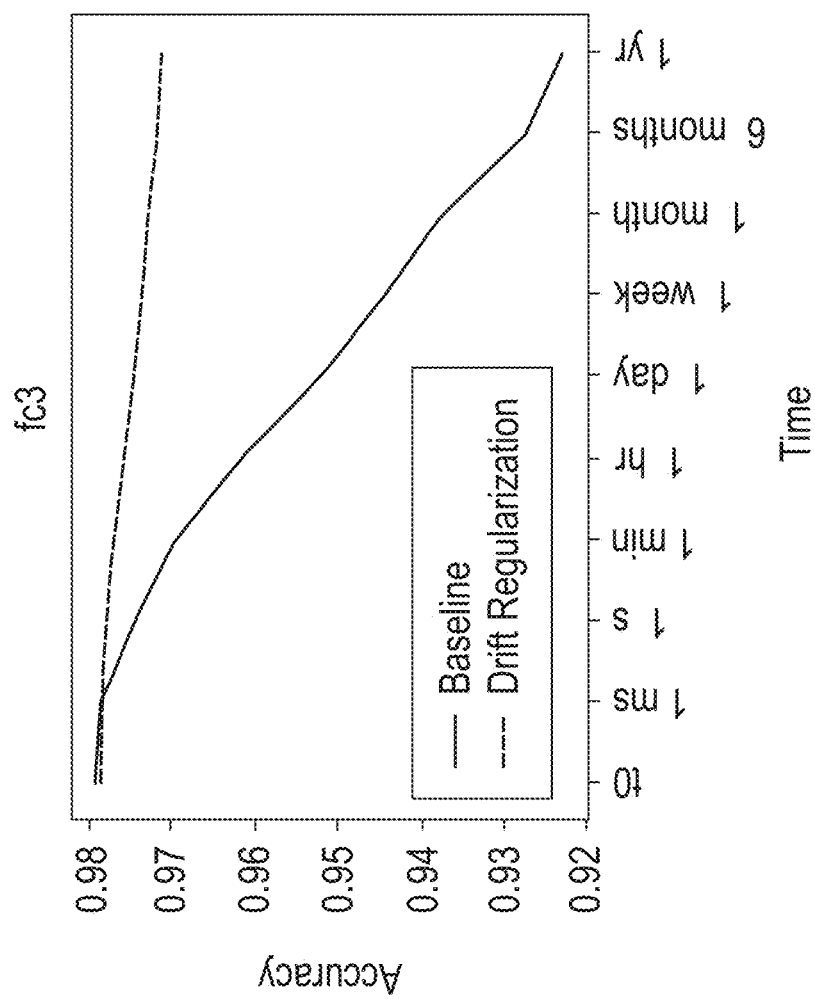
FIGS. 11A-C provide graphs of accuracy over time according to embodiments of the present disclosure.
Figure 11B:
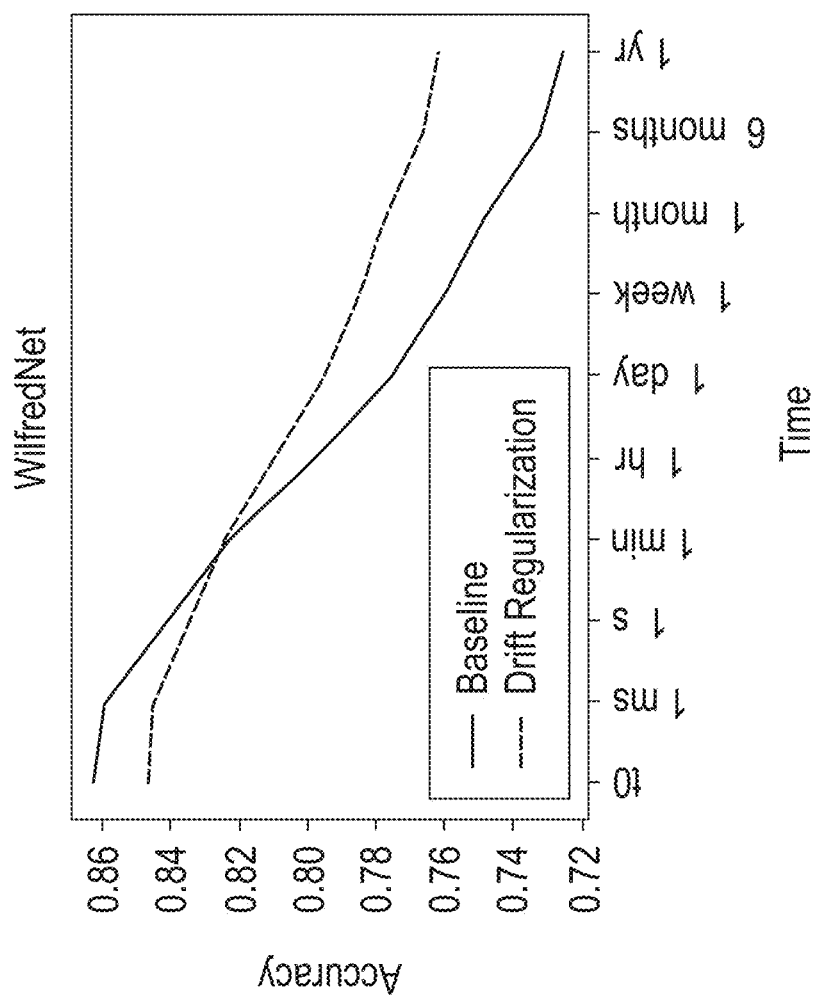
Figure 11C:
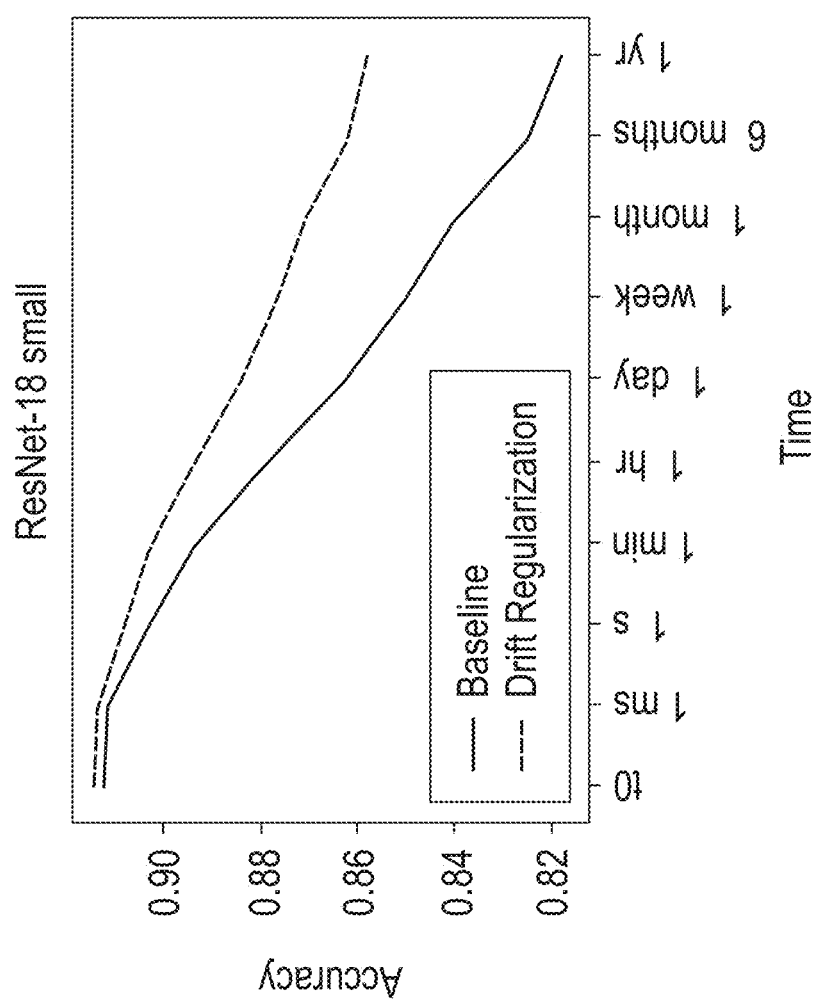

Referring to FIGS. 10A-C, additional heatmaps are provided showing classification-accuracy/perplexity vs. time for networks trained with different values of drift regularization parameter $\lambda$. In FIGS. 11A-C, corresponding graphs of accuracy over time are provided for the same three networks.

Figure 12:
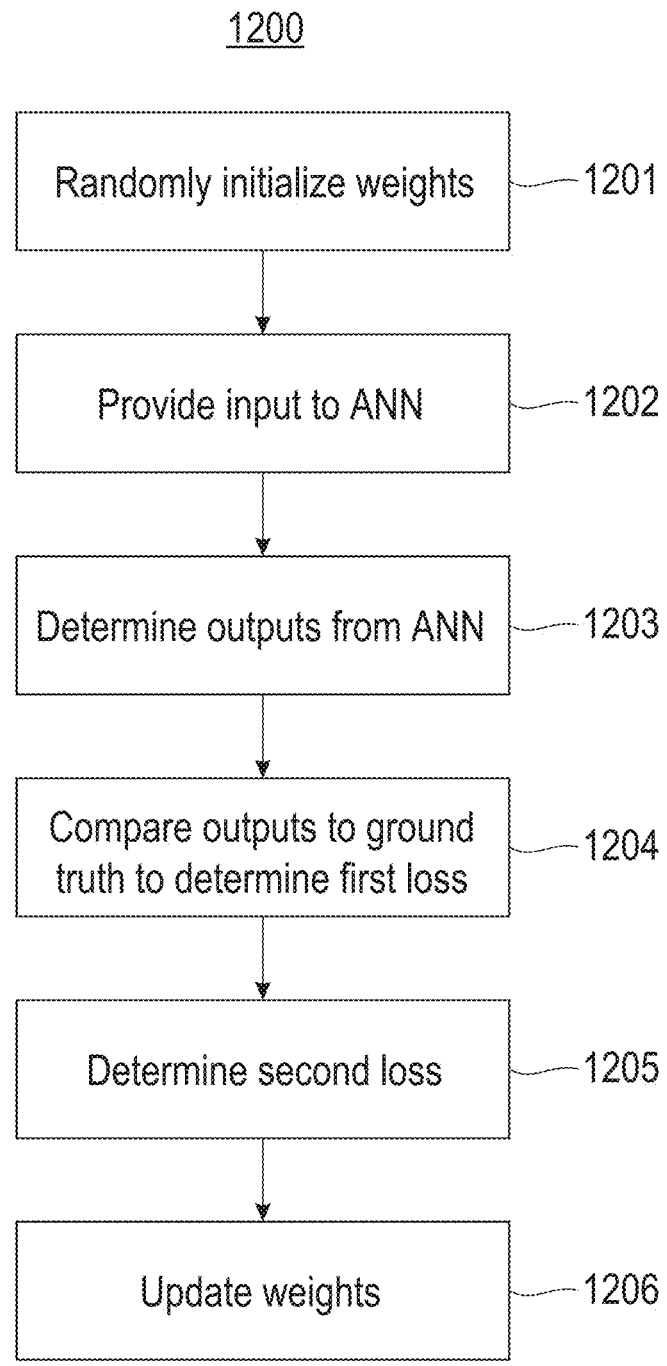
FIG. 12 illustrates a method of training an artificial neural network according to embodiments of the present disclosure.

Referring to FIG. 12, a method of training an artificial neural network is illustrated. At 1201, a plurality of weights is randomly initialized. Each of the plurality of weights corresponds to a synapse of an artificial neural network. At 1202, at least one array of inputs is inputted to the artificial neural network. At 1203, at least one array of outputs is determined by the artificial neural network based on the at least one array of inputs and the plurality of weights. At 1204, the at least one array of outputs is compared to ground truth data to determine a first loss. At 1205, a second loss is determined by adding a drift regularization to the first loss. The drift regularization is positively correlated to variance of the at least one array of outputs. At 1206, the plurality of weights is updated based on the second loss by backpropagation.

Figure 13:
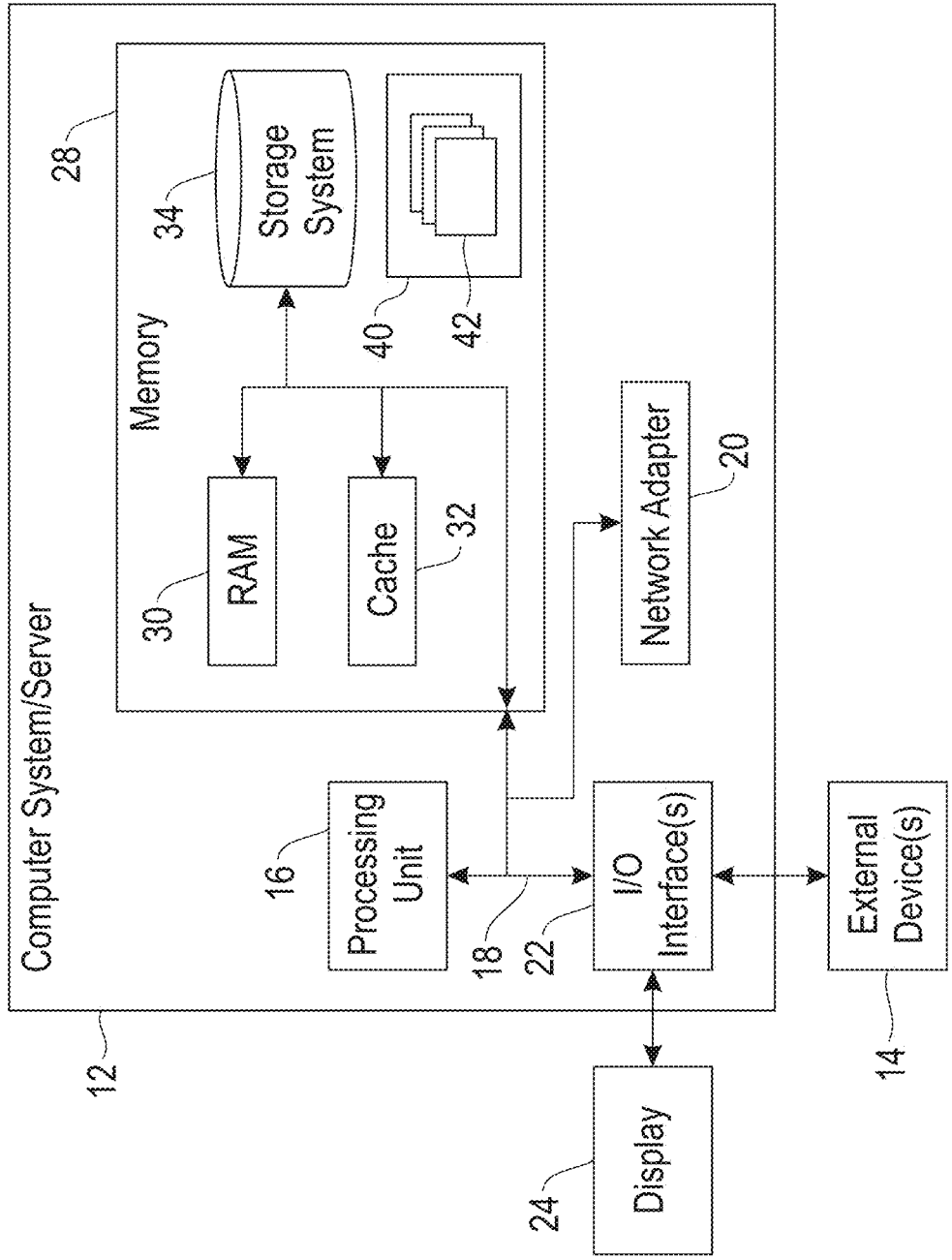
FIG. 13 depicts a computing node according to an embodiment of the present disclosure.

Referring now to FIG. 13, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training an artificial neural network, comprising:
    randomly initializing a plurality of weights, each of the plurality of weights corresponding to a synapse of an artificial neural network;
    inputting at least one array of inputs to the artificial neural network;
    determining by the artificial neural network at least one array of outputs based on the at least one array of inputs and the plurality of weights;
    comparing the at least one array of outputs to ground truth data to determine a first loss;
    determining a second loss by adding a drift regularization to the first loss, the drift regularization being positively correlated to variance of the at least one array of outputs; and
    updating the plurality of weights based on the second loss by backpropagation.

2. The method of claim 1, wherein the artificial neural network comprises a crossbar array of phase change memory elements.

3. The method of claim 1, wherein the artificial neural network comprises a plurality of layers.

4. The method of claim 1, wherein the first loss is a cross-entropy loss.

5. The method of claim 1, wherein determining the first loss comprises regularization.

6. The method of claim 1, comprising:
    further updating the plurality of weights by backpropagation until a target accuracy is obtained.

7. A system comprising:
    an artificial neural network comprising a crossbar array of phase change memory elements;
    a computing node comprising a computer readable storage medium having program instructions embodied therewith, the program instructions executable by a processor of the computing node to cause the processor to perform a method comprising:
        randomly initializing a plurality of weights, each of the plurality of weights corresponding to a synapse of the artificial neural network;
        inputting at least one array of inputs to the artificial neural network;
        obtaining from the artificial neural network at least one array of outputs based on the at least one array of inputs and the plurality of weights;
        comparing the at least one array of outputs to ground truth data to determine a first loss;
        determining a second loss by adding a drift regularization to the first loss, the drift regularization being positively correlated to variance of the at least one array of outputs; and
        updating the plurality of weights based on the second loss by backpropagation.

8. The system of claim 7, wherein the artificial neural network comprises a crossbar array of phase change memory elements.

9. The system of claim 7, wherein the artificial neural network comprises a plurality of layers.

10. The system of claim 7, wherein the first loss is a cross-entropy loss.

11. The system of claim 7, wherein determining the first loss comprises regularization.

12. The system of claim 7, the method further comprising:
    further updating the plurality of weights by backpropagation until a target accuracy is obtained.

13. A computer program product for training an artificial neural network, the computer program product comprising a computer readable storage medium having program instructions embodied therewith, the program instructions executable by a processor to cause the processor to perform a method comprising:
    randomly initializing a plurality of weights, each of the plurality of weights corresponding to a synapse of the artificial neural network;
    inputting at least one array of inputs to the artificial neural network;
    obtaining from the artificial neural network at least one array of outputs based on the at least one array of inputs and the plurality of weights;
    comparing the at least one array of outputs to ground truth data to determine a first loss;
    determining a second loss by adding a drift regularization to the first loss, the drift regularization being positively correlated to variance of the at least one array of outputs; and
    updating the plurality of weights based on the second loss by backpropagation.

14. The computer program product of claim 13, wherein the artificial neural network comprises a crossbar array of phase change memory elements.

15. The computer program product of claim 13, wherein the artificial neural network comprises a plurality of layers.

16. The computer program product of claim 13, wherein the first loss is a cross-entropy loss.

17. The computer program product of claim 13, wherein determining the first loss comprises regularization.

18. The computer program product of claim 13, the method further comprising:
    further updating the plurality of weights by backpropagation until a target accuracy is obtained.

* * * * *